US010412954B1

(12) United States Patent
Ellinghuysen

(10) Patent No.: US 10,412,954 B1
(45) Date of Patent: Sep. 17, 2019

(54) MODULAR TREE STAND AND ACCESSORY SUPPORT SYSTEM

(71) Applicant: Mark Ellinghuysen, Winona, MN (US)

(72) Inventor: Mark Ellinghuysen, Winona, MN (US)

(*) Notice: Subject to any disclaimer, the term of this patent is extended or adjusted under 35 U.S.C. 154(b) by 0 days.

(21) Appl. No.: 15/956,406

(22) Filed: Apr. 18, 2018

(51) Int. Cl.
*A01M 31/02* (2006.01)
*F41A 23/18* (2006.01)

(52) U.S. Cl.
CPC ............. *A01M 31/02* (2013.01); *F41A 23/18* (2013.01)

(58) Field of Classification Search
CPC .................................. A01M 31/02; F41A 23/18
USPC ............... 248/309.1, 156; 182/113, 116, 187
See application file for complete search history.

(56) References Cited

U.S. PATENT DOCUMENTS

| | | |
|---|---|---|
| 3,116,808 A | 1/1964 | Riley |
| 3,485,320 A | 12/1969 | Jones |
| 5,009,283 A | 4/1991 | Prejean |
| 5,039,052 A | 8/1991 | Carafice |
| 5,186,276 A | 2/1993 | Craig |
| 5,310,150 A | 5/1994 | Fecko |
| 5,482,241 A | 1/1996 | Oglesby |
| 5,769,372 A | 6/1998 | Klosterman |
| 5,967,475 A | 10/1999 | Johnson |
| 6,202,665 B1 | 3/2001 | O'Hare |
| 6,336,520 B1 * | 1/2002 | Amacker ............... A01M 31/02 182/135 |
| 6,457,685 B1 | 10/2002 | Taylor |
| 6,571,916 B1 | 6/2003 | Swanson |
| 6,595,325 B2 | 7/2003 | Ulrich |
| 6,663,059 B1 | 12/2003 | Warren |
| 8,016,134 B1 * | 9/2011 | Templin ............... F16M 13/022 211/107 |
| 8,733,227 B1 | 5/2014 | Ridgeway et al. |
| 9,585,379 B2 | 3/2017 | Dorrity |
| 9,938,734 B1 * | 4/2018 | Garis ....................... E04G 5/067 |
| 2002/0078988 A1 | 6/2002 | Valpredo |
| 2003/0168285 A1 | 9/2003 | Eastman, II |
| 2011/0308887 A1 * | 12/2011 | Johnson ................ A01M 31/02 182/187 |
| 2012/0168249 A1 * | 7/2012 | Furseth ................. A01M 31/02 182/113 |
| 2018/0110335 A1 * | 4/2018 | O'Hagan ............... A01K 97/22 |
| 2019/0055782 A1 * | 2/2019 | Infalt ......................... E06C 1/34 |
| 2019/0104728 A1 * | 4/2019 | Howell, Jr. ........... A01M 31/02 |

* cited by examiner

*Primary Examiner* — Muhammad Ijaz
(74) *Attorney, Agent, or Firm* — Foley & Lardner LLP

(57) ABSTRACT

An accessory support system configured for use with a tree stand includes a mounting plate having first opening, a stabilizing bar, and a mounting member configured to attach the mounting plate to a tree. The first opening is disposed proximal the proximal a first circumferential end of the mounting plate. The axis of the first opening is oriented in a direction that is substantially perpendicular to at least one of the upper axial end and a lower axial end of the mounting plate. An accessory support system including at least one support member may be receivable in the mounting plate. A retaining body disposed on the support member may be utilized to store a gun and bow. The accessory support stand may be reconfigured into a modular tree stand.

14 Claims, 35 Drawing Sheets

MODULAR TREE STAND AND ACCESSORY SUPPORT SYSTEM

TECHNOLOGY

The present technology relates generally to the field of tree stands. More specifically, it is related to an accessory support system for a tree stand that may be adapted for use as a modular tree stand having a variety of different configurations and operating modes.

SUMMARY

In one aspect, an accessory support system is provided that includes a mounting plate having a tree facing side, a front side opposite the tree facing side, an upper axial end, a lower axial end, a first circumferential end, and a second circumferential end. The mounting plate includes a first opening proximal the first circumferential end that is configured to receive a support member. The axis of the first opening is oriented in a direction that is substantially perpendicular to at least one of the upper axial end and the lower axial end. The accessory support system may further include a stabilizing bar, means for attaching the mounting plate to a tree, and a plurality of leveling holes configured to receive a plurality of fasteners.

In one embodiment, the accessory support system may include a deck support. The accessory support system may be configured as a modular tree stand, for example, by including a deck positioned atop an upper surface of the deck support. The deck may further include a central aperture and a plurality of louvers disposed in the central aperture, an arrangement that permits air flow through the deck while also obscuring the view through the central aperture. The accessory support system may also include a helper rail at least partially disposed on the deck support. Among the various possibilities, the helper rail may be used to stabilize a weapon or prevent a user from accidentally falling from the tree stand. An outer end of one of the posts of the helper rail may include an adjustment portion and an adjustment nut configured to set the height of the helper rail. In any of the above embodiments, the accessory support system may be used as a blind or safety system for an existing tree stand. Alternatively, accessory support system may further include a seat that can be attached to at least one of the mounting plate, deck, and deck support in order to function as a standalone tree stand.

In any of the above embodiments, a second opening may be disposed on the mounting plate proximal the second circumferential end whose axis is oriented in a direction that is substantially parallel to the axis of the first opening. In any of the above embodiments, the accessory support system may further include at least one support member configured to be received in either the first or the second opening. The position of each support member relative to the mounting plate may be set by a retaining body disposed on the support member. In any of the above embodiments, additional retaining bodies may be included on the one or more support members to mount accessories to the one or more support members. Among the various embodiments contemplated, two retaining bodies may be used in combination as a gun holder. The gun holder may include a recessed area shaped for receiving the stock of a gun. The recessed area may be connected to a retaining body via a lateral extension piece. The gun holder may further include a retaining body having a barrel hook configured to maintain the barrel of the gun parallel to the support member. In any of the above embodiments, a retaining body may further include a spacer arm and a hook disposed thereon. The spacer arm may pivotably attach to the retaining body to conveniently position the bow. In any of the above embodiments, the spacer arm and the hook may be disposed on one of the retaining bodies for the gun holder.

In some of the above embodiments, the accessory support system may further include a cross-stabilizer bar between the upper ends of a pair of support members. The cross-stabilizer bar may pivotably attach to one of the support members to simplify transport of the support member assembly into and out of a tree.

In any of the above embodiments, the accessory support system may further include a slide arm disposed proximal the lower axial end. In any of the above embodiments, the slide arm may include a third opening configured to be coaxial with the axis of the first opening. In any of the above embodiments, the slide arm may be configured to move relative the mounting plate to simplify transport of the assembly into and out of a tree. In any of the above embodiments, the accessory support system may include a locking handle to secure the slide arm in at least one position.

In any of the above embodiments, the accessory support system may include at least one blind branch that pivots near an uppermost end of the blind branch, allowing a user to customize blind positioning. In any of the above embodiments, a lowermost end of the blind branch may be engagable with the deck support.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Figure 33:
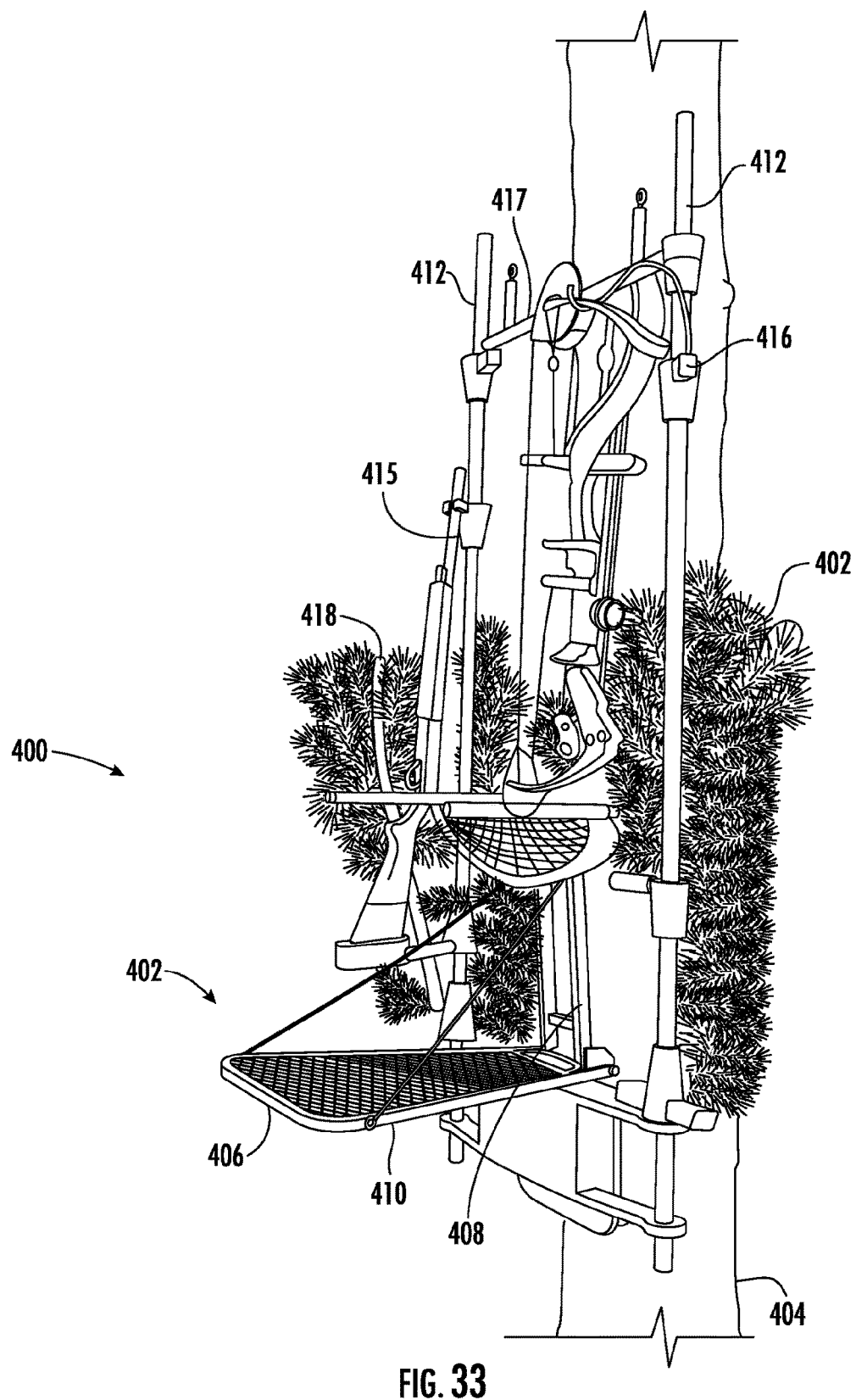
FIG. 33 is a prospective view of an accessory support system, according to an illustrative embodiment.

In general, disclosed herein are apparatuses that are used for concealment or utility during hunting. The apparatuses and devices have been developed to provide ready access to the tools and equipment that a hunter may use or need in the field, and the apparatuses and devices provide for added concealment of the hunter from her quarry. As a brief overview of the more detailed description to follow, and referring generally to FIG. 33, an accessory support system 400 is shown according to an illustrative embodiment. The accessory support system 400 is adapted for use in combination with an existing tree stand 402. As shown in FIG. 33, the existing tree stand 402 is removably attached to a tree 404 and includes a platform 406 and a seat 408. In the embodiment of FIG. 33, the accessory support system 400 is located beneath the platform 406 of the existing tree stand 402 and contacts a lower surface 410 of the platform 406. The accessory support system 400 is separately mounted to the tree 404, independent from the existing tree stand 402. The accessory support system 400 is configured to receive a pair of accessory support poles, referred to herein as support members 412. The height of the accessory support poles is adjustable. As shown in FIG. 33, a variety of attachments may be included on the accessory support poles. Among those shown are a gun holder 415, a bow hanger 416, a cross-supporting member with LED light, and blind branches 418, the branches may which provide concealment from approaching quarry. The accessory support system 400 may also include a seat attachment to provide a resting place for existing tree stands 402 that only include a platform 406. A cross-support member 417 may be included between the accessory support poles. The cross-support member 417 may be attached to the tree 404 to further stabilize the accessory support poles. The blind branches 418 may be configured to simulate an evergreen branch. The blind branches 418 may be received within holes in the accessory support system 400 that are oriented at an angle relative to the platform 406 to provide more space for a user.

Figures 34A, 34B:
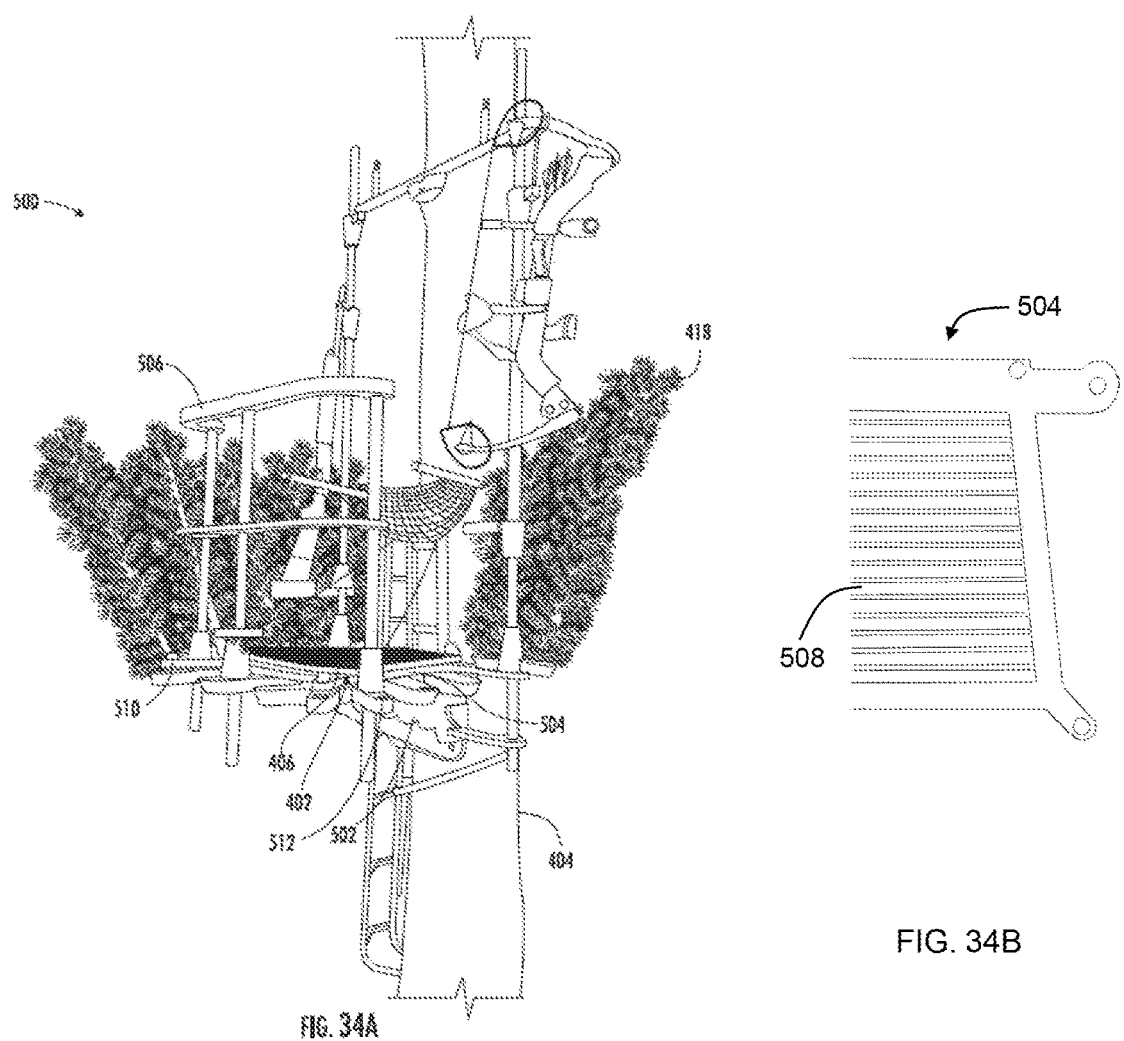
FIG. 34A is a prospective view of an accessory support system including a vertical blind, according to an illustrative embodiment.
FIG. 34B is a top view of a vertical blind plate from the accessory support system of FIG. 34A, according to an illustrative embodiment.

Referring generally to FIG. 34A, an accessory support system 500 is shown that has been adapted for use as a vertical blind as well as for use with an existing tree stand. As shown in FIG. 34A, the accessory support system 500 is located beneath an existing tree stand 402 and includes all of the various accessory components shown in FIG. 33. In the embodiment shown in FIG. 34A, the accessory support system 400 of FIG. 33 has been reconfigured to include framework 502 that extends away from the tree 404. The framework 502 extends beneath the platform 406 of the existing tree stand 402 and supports a vertical blind plate 504, a helper rail 506, and multiple blind branches 418. The accessory support system 500 is configured to structurally support the vertical blind plate 504, helper rail 506, and blind branches 418 independently from the existing tree stand 402. The framework that is position below the existing tree stand serves the functions of providing additional concealment of the hunter when viewed from a vantage point below the stand, and also anchoring points for concealment media such as the blind branches introduced above.

The vertical blind plate 504 is shown in more detail in FIG. 34B. The vertical blind plate 504 includes multiple louvers 508 that are angled with respect to the top surface of the vertical blind plate 504. Among other benefits, these louvers 508 prevent animals below the tree stand 402 (shown in FIG. 34A) from observing a user. In the embodiment shown in FIG. 34A, the vertical blind plate 504 is secured in position relative the existing tree stand 402 using multiple locating studs 510.

Figure 35:
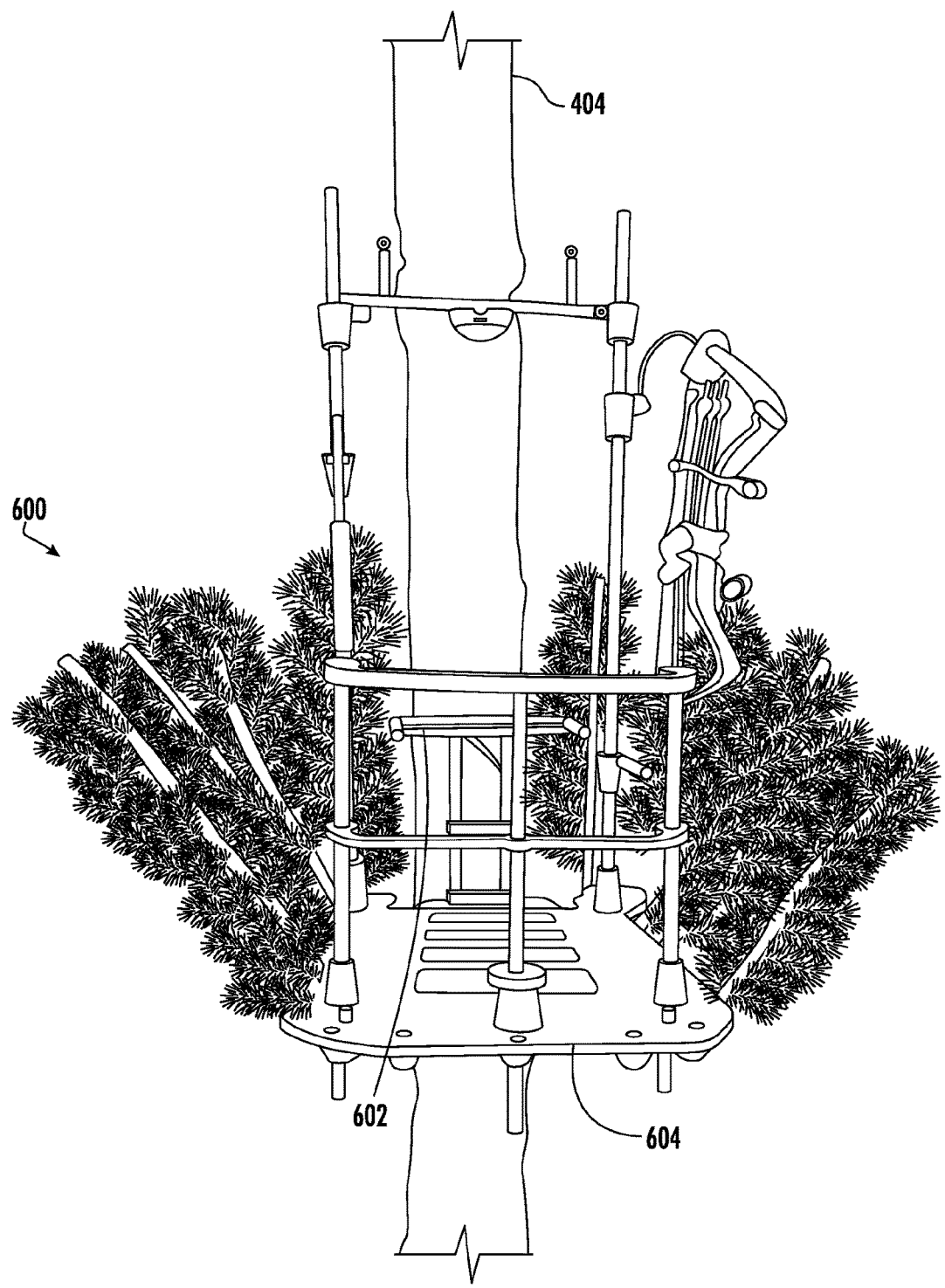
FIG. 35 is a prospective view of an accessory support system reconfigured as a modular tree stand, according to an illustrative embodiment.

As shown in FIG. 34A, the framework 502 of the accessory support system 500 includes multiple holes 512 through which the supporting posts, poles, and other support members of the helper rail 506 and blind branches 418 are connected. In the embodiment shown in FIG. 35, the helper rail 506 functions as a weapon support and prevents the user from falling from the tree stand 402. The height of the helper rail 506 may be adjusted to suit different users. The holes 512 also support a series of blind branches 418. As shown in FIG. 35, these blind branches 418 may be inserted at an angle to provide more space for a user. The position of the tops of the blind branches 418, away from the existing tree stand 402, may be tilted at a pivot point on the blind branch 418 to customize their layout and the layout of the blind for the existing tree stand 402.

Referring generally to FIG. 35, the accessory support system 400, 500 from FIGS. 33 and 34A may be reconfigured into a modular tree stand 600 that may fully support a user in the tree 404, without the need for an existing tree stand. In other words, the tree stand depicted in FIG. 35 is a full functioning stand that will support the weight of a hunter when positioned in the stand. The modular tree stand 600 shown in FIG. 35 includes all of the accessories disclosed above. In addition, the modular tree stand 600 includes its own seat 602 and platform 604. Like the vertical blind plate 504 (shown in FIG. 34B), the platform 604 may be removable from the modular tree stand 600, enabling the use of the modular tree stand 600 with a variety of different platform designs. Importantly, the modular tree stand 600 is reconfigurable and may be used with any combination of components discussed above. The details of the general depictions provided in FIGS. 33-35 will be more fully explained by reference to FIGS. 1-32.

Figure 1:
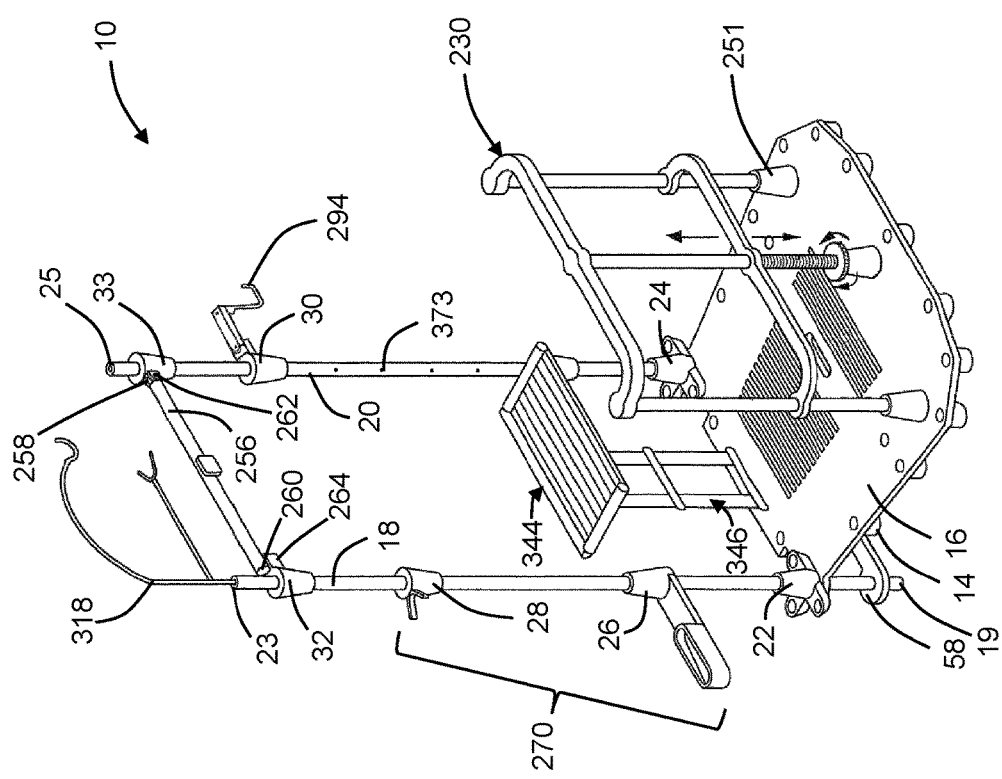
FIG. 1 is a prospective view of an accessory support system reconfigured as a modular tree stand according to an illustrative embodiment.
Figure 2:
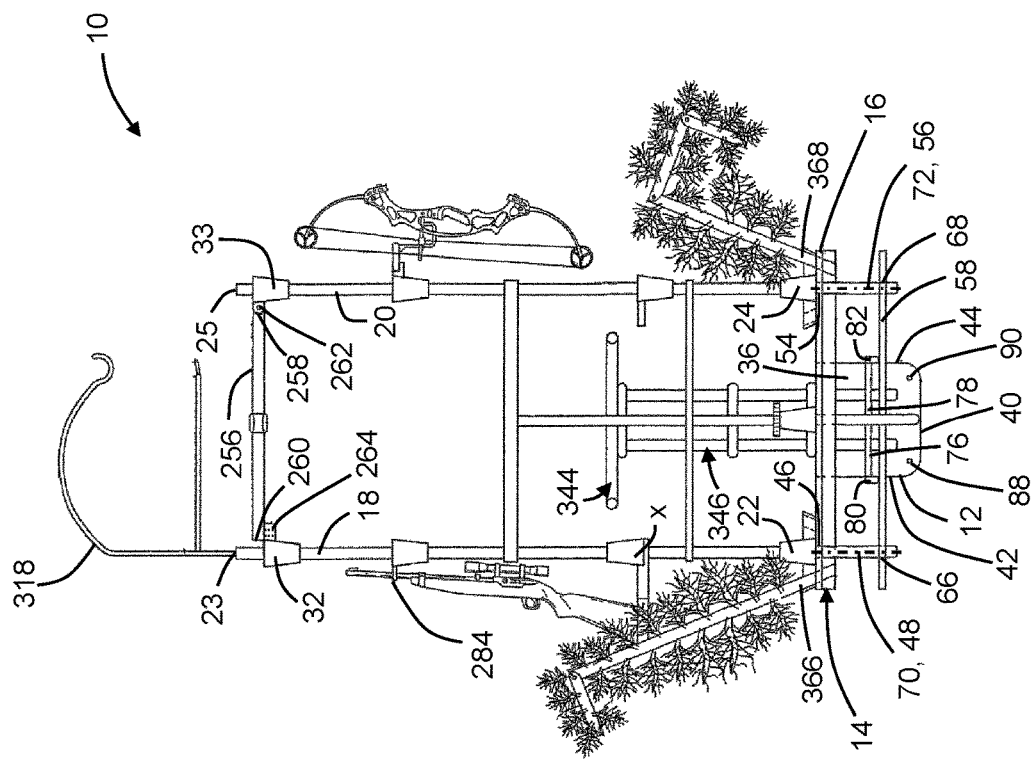
FIG. 2 is a front view of the modular tree stand of FIG. 1 including blind branches.

Referring now to FIGS. 1 through 5, a modular tree stand 10 is shown according to an illustrative embodiment. The modular tree stand 10 is shown in an apparatus configuration that may fully support a user in a tree. As shown in FIGS. 1 and 2, the modular tree stand 10 includes a mounting plate 12 (shown in FIG. 2), a deck support 14, and a deck 16. A pair of support members 18, 20 are mounted to the deck 16, which is further engaged with a plurality of retaining bodies 22, 24, 26, 28, 30, 32, 33. Among other functions, the pair of support members 18, 20 may be utilized to secure various accessories for ready access by a user; for example, the support members 18, 20 may be used to secure a weapon, camera, light, and umbrella.

Figure 3:
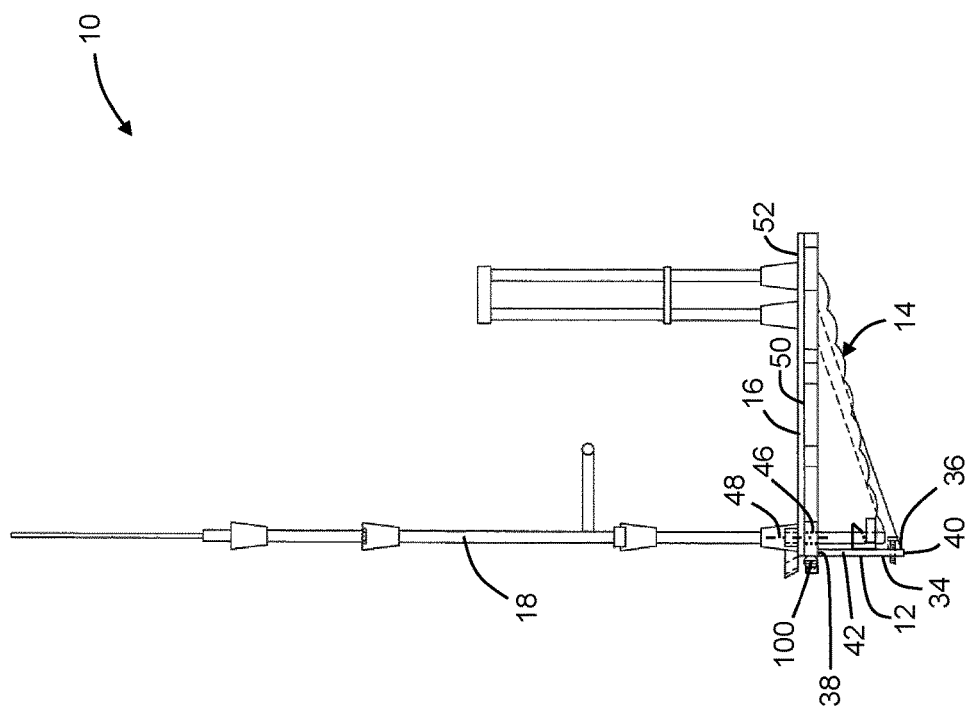
FIG. 3 is a side view of the modular tree stand of FIG. 1.
Figure 4:
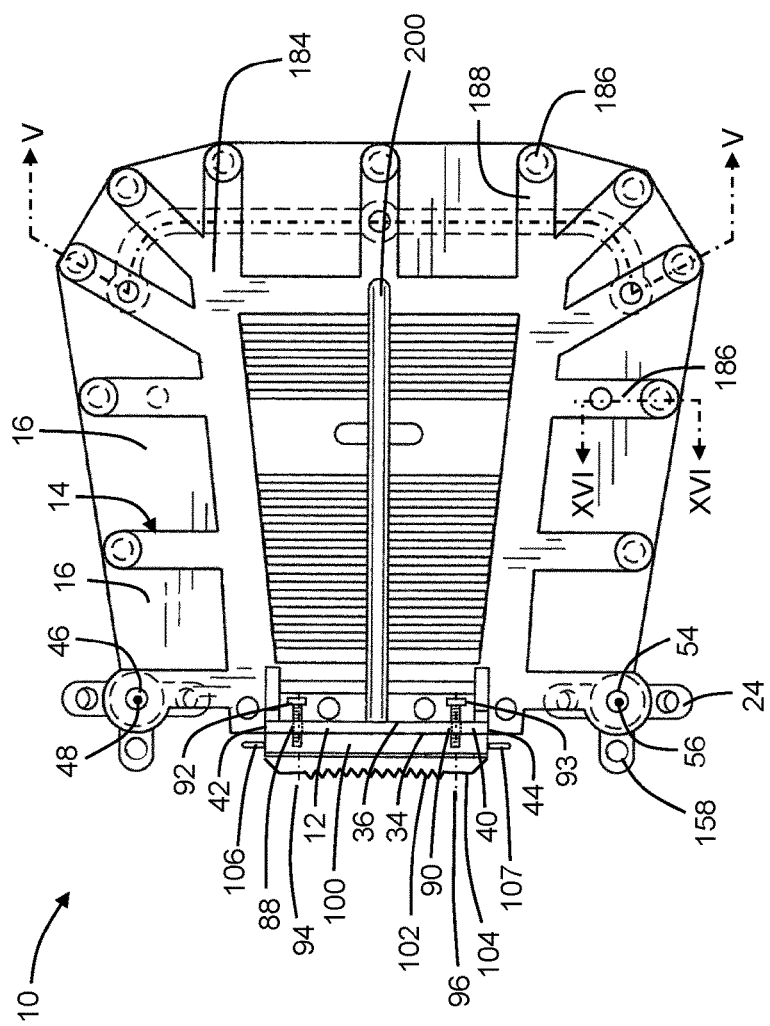
FIG. 4 is a bottom view of the modular tree stand of FIG. 1.

A side view and bottom view of the modular tree stand 10 is shown in FIGS. 3 and 4, respectively. As shown in FIGS. 3 and 4, the mounting plate 12 has a tree facing side 34, a front side 36 opposite the tree facing side 34, an upper axial end 38, a lower axial end 40 (shown in FIG. 3), a first circumferential end 42, and a second circumferential end 44 (shown in FIG. 4). As shown in FIG. 3, the deck support 14 is disposed on the mounting plate 12 proximal the upper axial end 38. The deck support extends beyond the front side 36 of the mounting plate 12 in a direction parallel the upper axial end 38. In the embodiment shown in FIGS. 3 and 4, the deck support 14 is fastened (e.g., using screws, bolts, tabs that insert from the deck support 14 to the mounting plate 12, or any other suitable fastening device) to the mounting plate 12 to reduce the number of components that must be transported up a tree. Alternatively, the deck support 14 may be removably disposed on the mounting plate 12, for example by using a set of hinges on the mounting plate or other quick-connect interface. In the embodiment shown in FIGS. 3 and 4, a deck 16 is disposed on the deck support 14 proximal an upper surface 50 of the deck support 14 and the upper axial end 38 (shown in FIG. 3).

As shown in FIG. 4, a first opening 46 is disposed on deck support 14 proximal the first circumferential end 42. The first opening 46 extends through both the deck support 14 and deck 16. As shown in FIG. 3, the axis 48 of the first opening 46 is oriented in a direction that is substantially perpendicular to both the upper surface 50 of the deck support 14 and an upper surface 52 of the deck 16, such that a first support member 18 will be oriented vertically when the modular tree stand 10 is attached to a tree. As shown in FIG. 4, a second opening 54 is disposed on the deck support 14 proximal the second circumferential end 44. The second opening 54 extends through the deck support 14 and deck 16. As shown in FIG. 4, the axis 56 of the second opening 54 is oriented in a direction that is substantially parallel to the axis 48 of the first opening 46.

Figure 6:
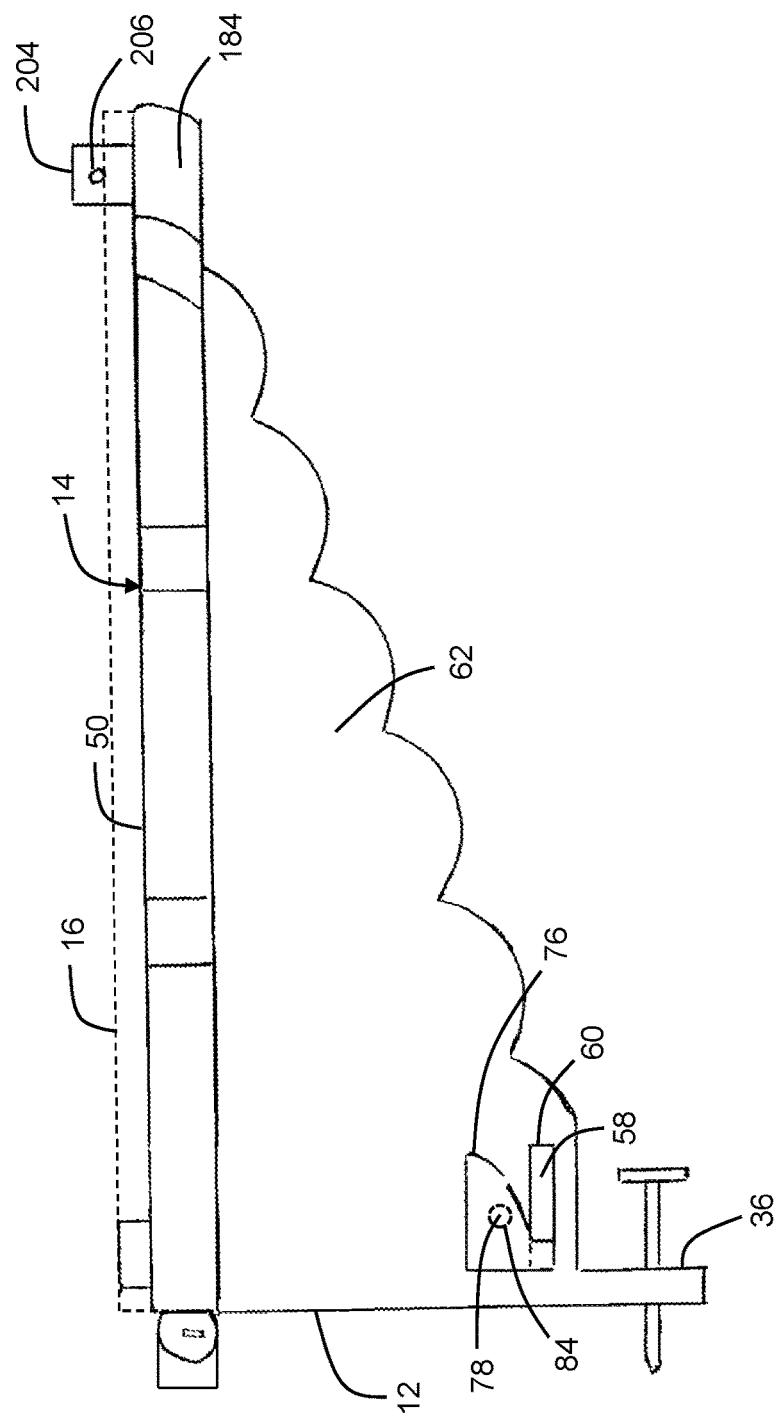
FIG. 6 is a side view of a mounting plate and a deck support of FIGS. 1 through 5.
Figure 7:
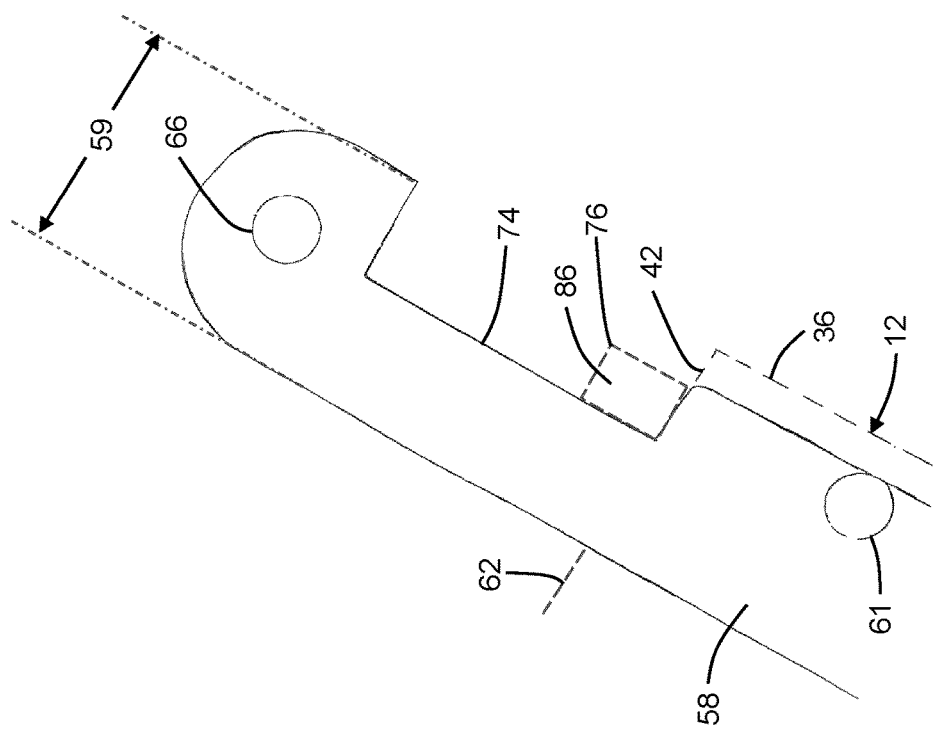
FIG. 7 is a top view of a portion of a slide arm, according to an illustrative embodiment.

As shown in FIGS. 1 and 2, an accessory support system reconfigured as a modular tree stand 10 further includes a slide arm 58 proximal the lower axial end 40 (as shown in FIG. 2) of the mounting plate 12. As shown in FIG. 2, at least part of the slide arm 58 extends beyond the first circumferential end 42 of the mounting plate 12 in a direction parallel to the lower axial end 40, such that it protrudes past the first circumferential end 42. Likewise, at least part of the slide arm 58 extends beyond the second circumferential end 44 of the mounting plate 12 in a direction parallel to the lower axial end 40, such that it protrudes pas the second circumferential end 44. The slide arm 58 may be disposed in an opening through any part of the modular tree stand 10. FIG. 6 shows a side view of the mounting plate 12 and deck support 14 of FIGS. 1 through 5. As shown in FIG. 6, the deck support 14 further includes side covers 62, 64 (side cover 64 is not shown but is identical to side cover 62), as will be described below. As shown in FIG. 6, the slide arm 58 is disposed in an opening 60 through side covers 62, 64 proximal the front side 36 of the mounting plate 12. FIG. 7 shows a top view of a portion of the slide arm 58 proximal the first circumferential end 42 of the mounting plate 12. The portion of the slide arm 58 shown in FIG. 7 is a mirror image of a portion of the slide arm 58 proximal the second circumferential end 44 of the mounting plate 12. As shown in FIG. 7, the slide arm 58 includes a third opening 66 disposed proximal the first circumferential end 42. In the position shown in FIG. 2, the axis 70 of the third opening 66 is configured to be substantially coaxial with the axis 48 of the first opening 46 such that a lower end 19 of a first support member 18 passes through and is supported by both the first opening 46 and the third opening 66 simultaneously. Similarly, the axis 72 of a fourth opening 68 located proximal the second circumferential end 44 is configured to be substantially coaxial with the axis 56 of the second opening 54 such that a lower end 21 of the second support member 20 passes through and is supported by both the second opening 54 and the fourth opening 68 simultaneously.

To assist with transport of the modular tree stand 10 into and out of a tree, the slide arm 58 is configured to move relative the mounting plate 12 between an extended position in which the third opening 66 is extended away from the mounting plate 12, and a retracted position in which the third opening 66 is positioned adjacent to the first circumferential end 42. In the embodiment of FIG. 7, the slide arm 58 includes a rectangular positioning slot 74 that faces the front side 36 of the mounting plate 12. To prevent the slide arm 58 from passing through the side cover 62 in either the extended or retracted positions, the thickness 59 of the slide arm 58 perpendicular the front side 36 of the mounting plate 12 may be greater than the width of the opening 60 through side covers 62, 64 (also see FIG. 6) near the third opening 66.

Figure 8:
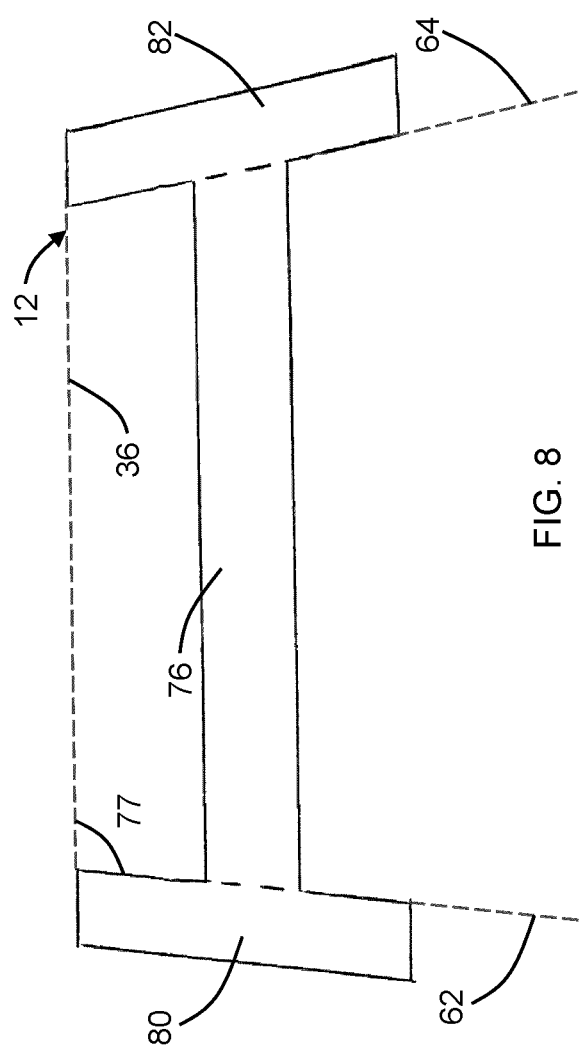
FIG. 8 is a top view of a locking handle, according to an illustrative embodiment.

As shown in FIGS. 2 and 6, the modular tree stand 10 also includes a locking handle 76 that interfaces with the slide arm 58 and secures the slide arm 58 in at least one position. As shown in FIG. 2, the locking handle 76 includes a connecting rod 78 and levers 80, 82. As shown in FIG. 2, the connecting rod 78 is oriented parallel to the slide arm 58. As shown in FIG. 6, the connecting rod 78 is disposed in a mounting hole 84 through side cover 62. In the embodiment shown in FIG. 6, the locking handle 76 is engaged with the slide arm 58 (also see FIG. 2). Referring now to FIG. 7, when the locking handle 76 is engaged with the slide arm 58, the locking handle 76 is disposed in a portion 86 of the positioning slot 74 farthest from the third opening 66. FIG. 8 shows a top view of the locking handle 76, according to an illustrative embodiment. As shown in FIG. 8, the levers 80, 82 are angled to match the angle 77 formed between the side covers 62, 64 and the front side 36 of the mounting plate 12. Alternatively, the levers 80, 82 may be oriented perpendicular the front side 36 of the mounting plate 12 or any other suitable angle.

Figure 9:
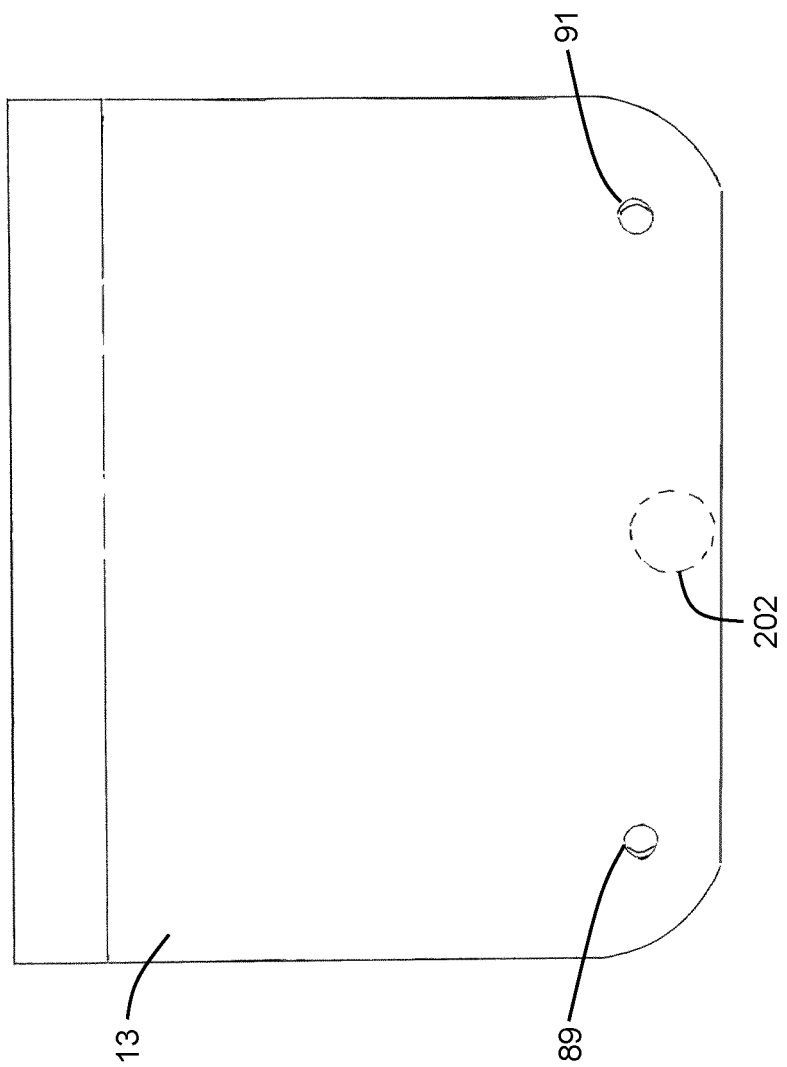
FIG. 9 is a front view of a portion of a mounting plate, according to an illustrative embodiment.
Figure 10:
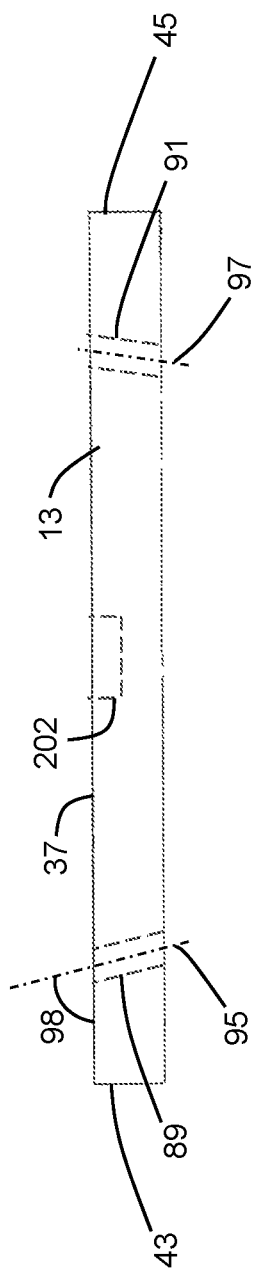
FIG. 10 is a top view of the portion of the mounting plate of FIG. 9.

Returning to FIG. 2, a plurality of leveling holes 88, 90 is disposed on the front side 36 of the mounting plate 12 proximal the lower axial end 40. As shown in FIG. 4, each leveling hole 88, 90 is configured to engage with a fastener 92, 93. In the embodiment shown in FIG. 4, the fasteners 92, 93 take the form of threaded bolts configured to engage a tree. These fasteners 92, 93 provide a user with the ability to adjust the level of the modular tree stand 10 by rotating the fasteners 92, 93 into and out of the mounting plate 12. In the embodiment of FIG. 4, the axes 94, 96 of the leveling holes 88, 90 are both perpendicular to the front side 36 of the mounting plate 12. Alternatively, the axes of one or both of the leveling holes may be angled. FIGS. 9 and 10 show a front view and a bottom view, respectively, of an alternative embodiment of a mounting plate 13. As shown in FIG. 10, the axes 95, 97 of one or both of the leveling holes 89, 91 may be at an angle 98 of less than 90° relative to the front side 37 of the mounting plate 13 in order to accommodate the natural curvature of a tree. In the embodiment of FIG. 10, the axis 95 of the leveling hole 89 proximal the first circumferential end 43 is angled away from the axis 97 of the leveling hole 91 proximal the second circumferential end 45. In the embodiment of FIG. 10, each axis 95, 97 forms an angle of 80° with the front side 37 of the mounting plate 13, although any suitable angle may be utilized.

As shown in FIGS. 3 and 4, the modular tree stand 10 further includes a stabilizing bar 100 disposed on the deck support 14. Alternatively, the stabilizing bar 100 may be disposed on the mounting plate 12. The stabilizing bar 100 is positioned so that at least part of the stabilizing bar 100 extends beyond the tree facing side 34 of the mounting plate 12; for example, such that at least one edge or surface of the stabilizing bar 100 protrudes out a distance from the tree facing side 34 (such that part of the stabilizing bar 100 may engage with a tree). As shown in FIG. 4, a set of teeth 102 are disposed on the stabilizing bar 100. The teeth 102 are configured to contact a tree and prevent rotation of the modular tree stand 10 about the perimeter of the tree. Other suitable shapes may also be utilized; for example, the stabilizing bar 100 may include fewer teeth or have teeth that are shaped differently to improve engagement with the tree. Furthermore, a surface 104 of the stabilizing bar 100 upon which the teeth 102 are disposed may be curved to increase the number of teeth 102 engaged with the tree. As shown in FIG. 4, the modular tree stand 10 includes a mounting member configured to attach the mounting plate 12 to a tree. In the embodiment shown in FIG. 4, the mounting member takes the form of a set of eyelets 106, 107 disposed on the stabilizing bar 100, a first eyelet 106 proximal the first circumferential end 42 and a second eyelet 107 proximal the second circumferential end 44. The eyelets 106, 107 are configured to engage with a manual strap, such as a ratchet strap, to secure the modular tree stand 10 to a tree. A variety of alternatives are contemplated; for example, the eyelets 106, 107 may be disposed on the mounting plate 12. Alternatively, the mounting member may take the form of one or more mounting slots disposed on one or both of the stabilizing bar 100 and mounting plate 12. The mounting slot(s) may be configured to interface with the manual strap. Alternatively, the mount member may take the form of one or more bolts that fasten the mounting plate 12 directly to a tree.

Figure 11:
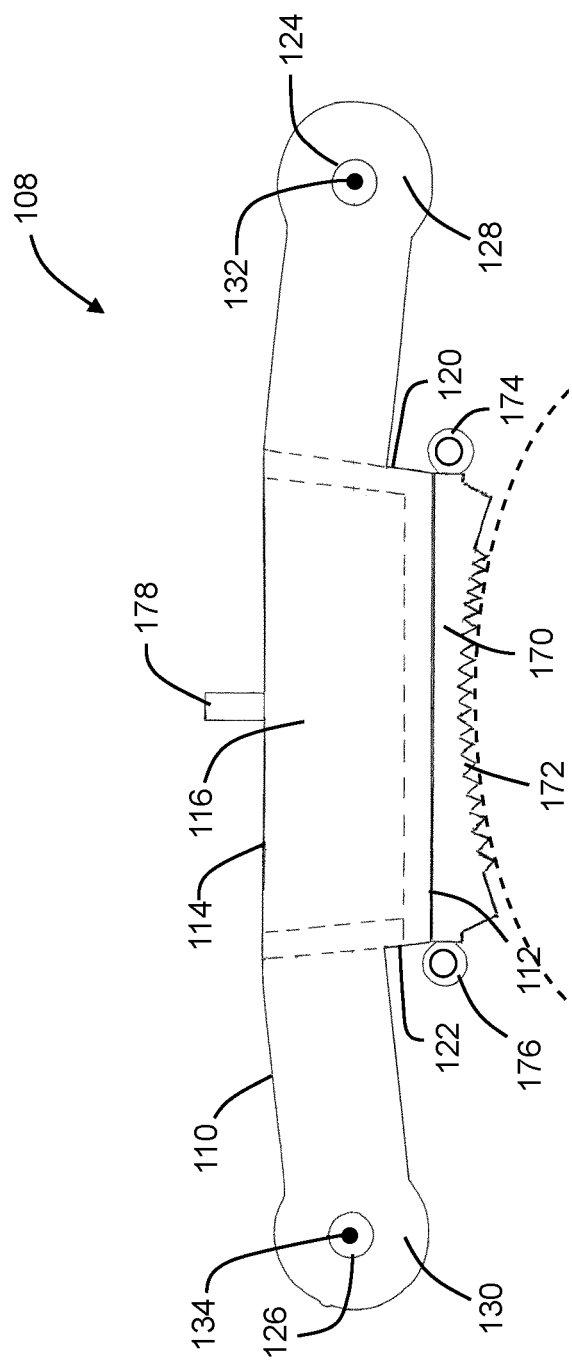
FIG. 11 is a top view of a modular tree stand, according to an illustrative embodiment.
Figure 12:
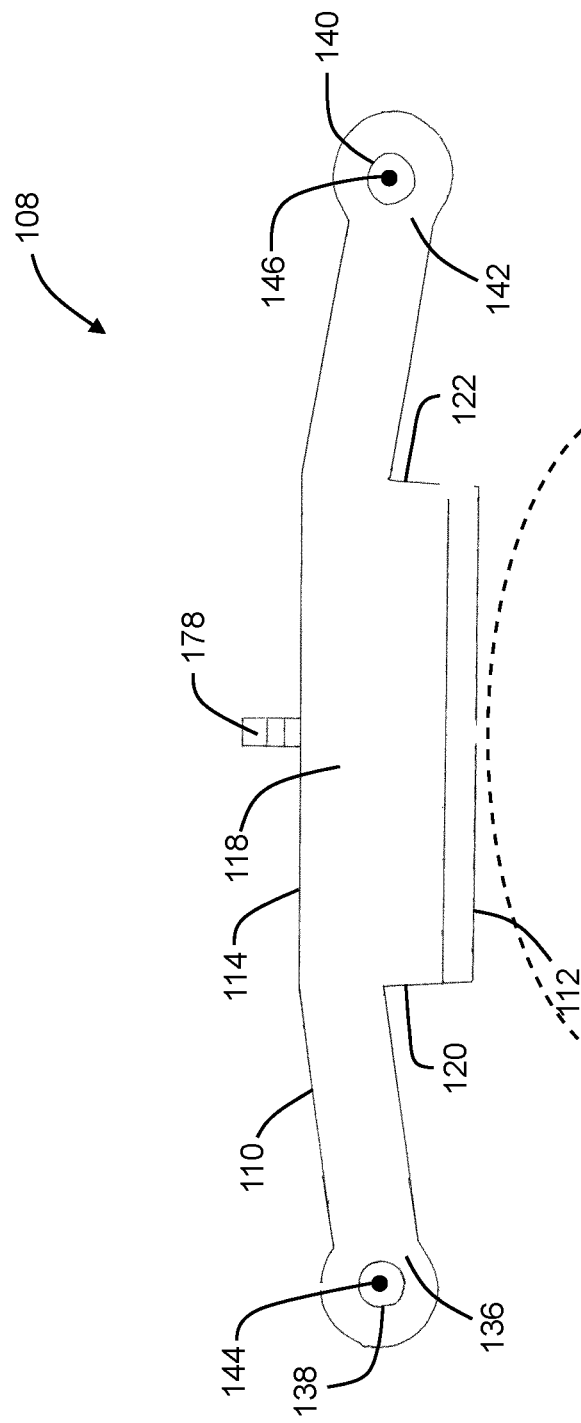
FIG. 12 is a bottom view of the modular tree stand of FIG. 11.
Figure 13:
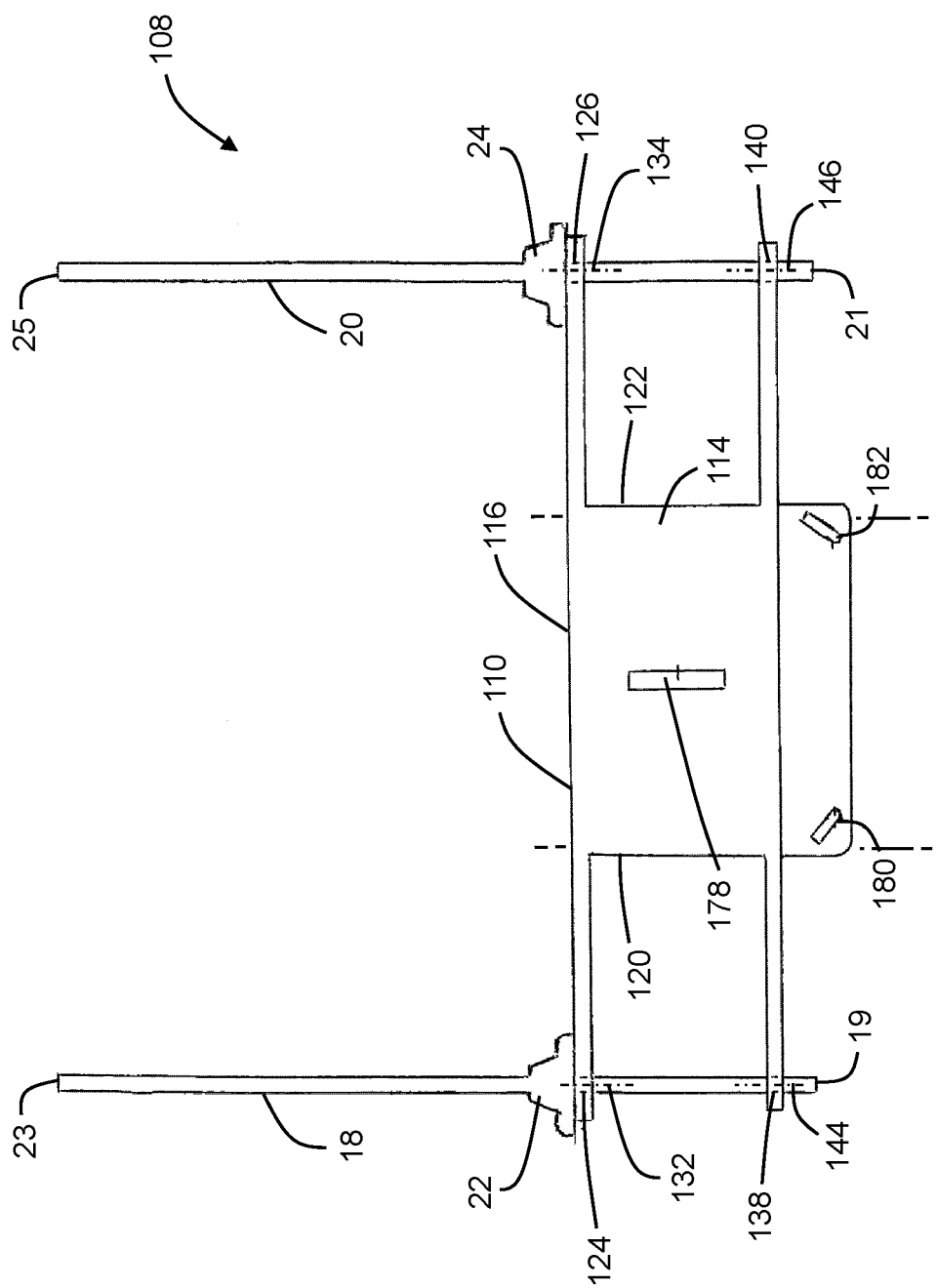
FIG. 13 is a front view of the modular tree stand of FIG. 11 including support members.

FIGS. 11 through 13 show an embodiment of an accessory support system 108 that is configured for use in combination with an existing tree stand. As shown in FIGS. 11 and 12, the accessory support system 108 includes a mounting plate 110 having a tree facing side 112, a front side 114 opposite the tree facing side 112, an upper axial end 116, a lower axial end 118, a first circumferential end 120, and a second circumferential end 122. As shown in FIG. 11, the mounting plate 110 further includes a first arm 128 disposed proximal the first circumferential end 120 and a second arm 130 disposed proximal the second circumferential end 122. In the embodiments shown in FIG. 11, the first arm 128 and second arm 130 are both disposed proximal the upper axial end 116 of the mounting plate 110. A first opening 124 is disposed proximal the first circumferential end 120 on the first arm 128. In the embodiment shown in FIG. 11, the first arm 128 extends a distance beyond the first circumferential end 120, such that it protrudes past the first circumferential end 120. The second opening 126 is disposed proximal the second circumferential end 122 on the second arm 130. In the embodiment shown in FIG. 11, the second arm 130 extends a distance beyond the second circumferential end 122, such that it protrudes past the second circumferential end 122. As shown in FIG. 11, the axis 132 of the first opening 124 is oriented in a direction that is substantially perpendicular to both the upper axial end 116 and the lower axial end 118 (as shown in FIG. 11). The axis 134 of the second opening 126 is oriented in a direction that is substantially parallel the axis 132 of the first opening 124.

As shown in FIG. 12, the accessory support system 108 includes a third arm 136 disposed on the mounting plate 110 proximal the first circumferential end and lower axial end 118. Like the first arm 128, the third arm 136 extends a distance beyond both the first circumferential end 120 and the second circumferential end 122 of the mounting plate 110. A third opening 138 is disposed on the third arm 136 proximal the lower axial end 118 and the first circumferential end 120. A fourth opening 140 is disposed on a fourth support arm 142 proximal the lower axial end 118 and the second circumferential end 122. FIG. 13 shows a front view of the accessory support system 108, including a pair of support members 18, 20. As shown in FIG. 13, the axis 144 of the third opening 138 is substantially coaxial with the axis 132 of the first opening 124, while the axis 146 of the fourth opening 140 is substantially coaxial with the axis 134 of the second opening 126. As shown in FIGS. 11 and 12, together the first opening 124 and the third opening 138 form a first hole proximal the first circumferential end 120 that extends through the entire mounting plate 110. Similarly, together the second opening 126 and the fourth opening 140 form a second hole proximal the second circumferential end 122 that extends through the entire mounting plate 110.

In the embodiment of FIG. 13, the accessory support system 108 further includes a pair of support members 18, 20, a first support member 18 proximal the first circumferential end 120 of the mounting plate 110 and a second support member 20 proximal the second circumferential end 122 of the mounting plate 110. The support members 18, 20 may take the form of a set of poles, rods, or post of various cross-sectional shapes and sizes. As shown in FIG. 13, the support members 18, 20 may take the form of a set of cylindrical poles. As shown in FIG. 13, the accessory support system 108 includes two retaining bodies 22, 24. Each retaining body 22, 24 is configured to be disposed on a corresponding one of the pair of support members 18, 20. The support members 18, 20 and associated retaining bodies 22, 24 may be the same as used in the embodiment of the modular tree stand 10 of FIGS. 1 through 5. As shown in FIG. 13, each of the support members 18, 20 has a lower end 19, 21 and an upper end 23, 25. The lower end 19, 21 of each support member 18, 20 is configured to be received in one of the first opening 124 and the second opening 126. Specifically, the lower end 19 of the first support member 18 is received in the first opening 124 and extends through the third opening 138, while the lower end 21 of the second support member 20 is received in the second opening 126 and extends through the fourth opening 140. Each of the retaining bodies 22, 24 is configured to set the position of a corresponding one of the support members 18, 20 relative the mounting plate 110.

Figure 14:
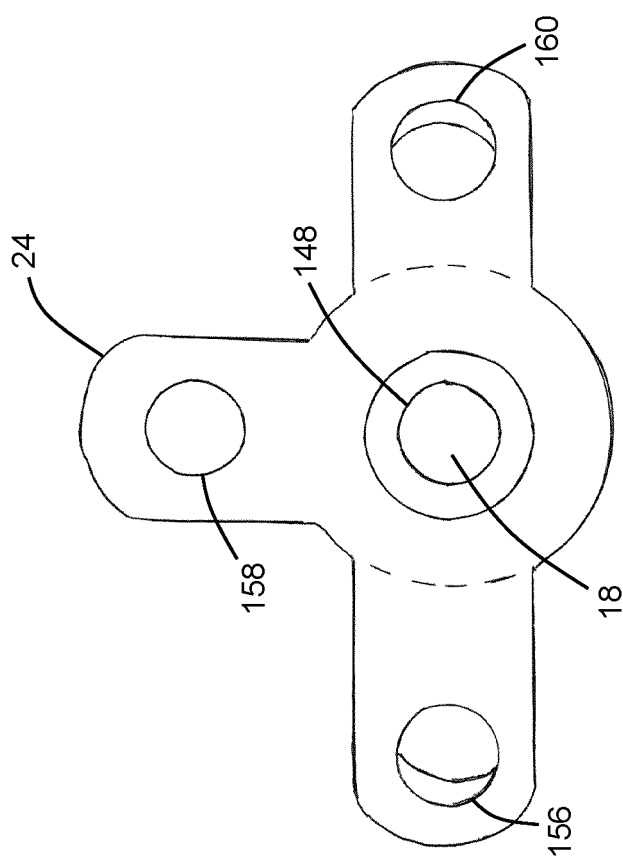
FIG. 14 is a top view of a retaining body, according to an illustrative embodiment.
Figure 15:
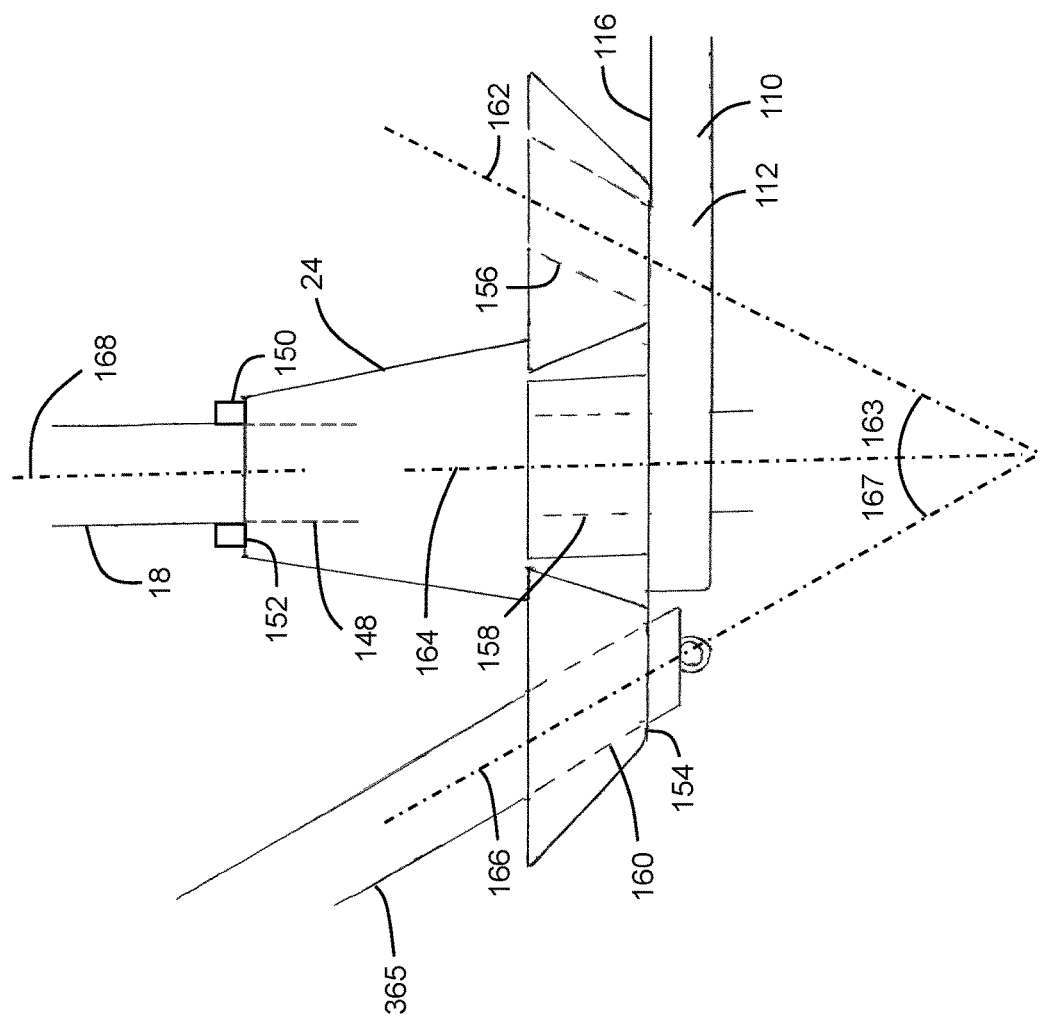
FIG. 15 is a side view of the retaining body of FIG. 14.

FIGS. 14 and 15 shows a top and rear view, respectively, of the retaining body 24 for the second support member 20. In both the embodiment shown in FIGS. 1 through 5 and the embodiment shown in FIG. 13, the retaining body 24 disposed on the second support member 20 is identical to the retaining body 22 disposed on the first support member 18. In other embodiments, the retaining bodies may be different. As shown in FIG. 14, the retaining body 24 is conical in shape, having a diameter at one end that is smaller than the diameter at the other (e.g., frustoconical), although a variety of other shapes may be utilized. The retaining body 24 includes a through-hole 148 centrally disposed on the retaining body 24 configured to receive the second support member 20. As shown in FIG. 15, the position of the second support member 20 relative the mounting plate 110 is set using a retaining O-ring 150 disposed on the second support member 20. The retaining O-ring 150 contacts the top surface 152 of the retaining body 24, which prevents the second support member 20 from passing through the retaining body 24. As shown in FIG. 15, a lower surface 154 of the retaining body 24 contacts the upper axial end 116 of the mounting plate 110. Alternatively, the position of the second support member 20 could be set relative the mounting plate 110 using a set screw through the retaining body 24 that contacts the second support member 20, a set pin passing through both the retaining body 24 and second support member 20, or any other suitable fastener that would secure the retaining body 24 to the second support member 20.

As shown in FIGS. 14 and 15, the retaining body 24 also includes three support holes 156, 158, 160 spaced from the through-hole 148 (shown in FIG. 14) and arranged circumferentially about the retaining body 24. As shown in FIG. 15, the axis 162, 164, 166 of any one of the first 156, second 158, and third 160 support holes may be angled relative to the axis 168 of the through-hole 148. For example, the axis 162, 164, 166 of any one of the first 156, second 158, and third 160 support holes may form an angle with the axis 168 of the through-hole 148 in the range of 0° to 50°. If angled, this range is preferably within 25° to 35° so that any components inserted through the support holes 156, 158, 160 do not extend too far from the accessory support system 108. In the embodiment shown in FIG. 15, the axes 162, 166 of the first 156 and third 160 support holes form an angle 163, 167 of 30° with the axis 168 of the through-hole 148, whereas the axis 164 of the second support hole 158 is parallel with the axis 168 of the through-hole 148. As shown in FIGS. 14 and 15, the retaining body 24 is free to rotate about the second support member 20. In the embodiment shown in FIG. 15, the retaining body 24 is arranged so that the second support hole 158 extends beyond the tree facing side 112 of the mounting plate 110. Hence, maintaining the axis 164 of the second support hole 158 parallel with the axis 168 of the through-hole 148 prevents any components inserted into the second support hole 158 from contacting a tree.

A similar rotational configuration of the retaining body 24 is shown in FIG. 4. Again the retaining body 24 is arranged so that the second support hole 158 extends beyond the tree facing side 34 of the mounting plate 12.

Returning to FIG. 11, the accessory support system 108 further includes a stabilizing bar 170 disposed on the tree facing side 112 of the mounting plate 110 proximal the upper axial end 116. The stabilizing bar 170 is positioned so that at least part of the stabilizing bar 100 extends beyond the tree facing side 112 of the mounting plate 110; for example, such that at least one edge or surface of the stabilizing bar 170 protrudes out a distance from the tree facing side 112 (such that part of the stabilizing bar 170 may engage with a tree). Similar to the embodiment of FIGS. 1 through 5, the stabilizing bar 170 shown in FIG. 10 includes a set of teeth 172 that are configured to contact a tree and prevent rotation of the accessory support system 108 about the perimeter of the tree. The stabilizing bar 170 further includes a pair of eyelets 174, 176 disposed on the stabilizing bar 170, a first eyelet 174 proximal the first circumferential end 120 and a second eyelet 176 proximal the second circumferential end 122. As shown in FIGS. 11 through 13, the accessory support system 108 further includes a handle 178 is disposed on the mounting plate 110 centered on the front side 114. As shown in FIG. 13, the handle 178 is oriented perpendicular to the upper axial end 116 of the mounting plate 110. Alternatively, the handle 178 may be oriented parallel the upper axial end 116 or in any other position suitable for transport of the mounting plate 110.

As shown in FIG. 13, the mounting plate 110 includes two leveling holes 180, 182 disposed on the front side 114 of the mounting plate 110 proximal the lower axial end 118. A first leveling hole 180 is disposed proximal the first circumferential end 120 and a second leveling hole 182 is disposed proximal the second circumferential end 122. In the embodiment of FIG. 12, the leveling holes 180, 182 take the form of an elongated slot configured to receive a fastener. The exact location and angle of the leveling holes 180, 182 may vary depending on the geometry of the mounting surface and the desired range of adjustment of the accessory support system 108.

Figure 16:
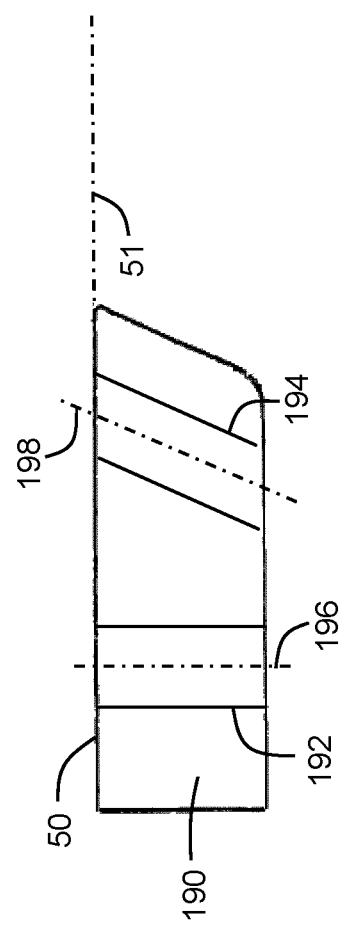
FIG. 16 is a front view of a support arm, according to an illustrative embodiment.

Returning now to the embodiment of FIGS. 1 through 5, the deck 16 is disposed proximal the upper surface 50 of the deck support 14. The deck support 14 provides a stable surface upon which the deck 16 may be disposed and to which a variety of accessories for the modular tree stand 10 may be mounted. In embodiments where the deck support 14 is used as part of the accessory support system for an existing tree stand, the deck support 14 may not provide any structural support to the existing tree stand. Alternatively, it may further support and stabilize the existing tree stand. As shown in FIG. 4, the deck support 14 includes a support structure 184 disposed proximal the upper axial end 38 that is configured to support the deck 16 near its outer perimeter. In the embodiment shown in FIG. 4, the upper surface 50 of the deck support 14 is oriented parallel the upper axial end 38 of the mounting plate 12 and perpendicular to the front side 36 of the mounting plate 12. The deck support 14 also includes a plurality of holes 186 disposed about the perimeter of the support structure 184. Each of the holes 186 is configured to receive a support post, rod, pole, or other member which accommodates the various accessory features for the modular tree stand 10. In the embodiment shown in FIG. 4, one or more of the holes 186 are disposed on each one of a plurality of support arms 188 disposed on the outer perimeter of the support structure 184. FIG. 16 shows a front view of support arm 190 from FIG. 4. As shown in FIG. 16, two holes 192, 194 are disposed in the support arm 190. The holes 192, 194 may be oriented at any angle relative to the upper surface 50 of the deck support 14. In the embodiment shown in FIG. 16, the axis 196 of hole 192 is oriented perpendicular to the upper surface 50 of the deck support 14, while the axis 198 of hole 194 is oriented at a 60° relative a plane 51 oriented substantially parallel the upper surface 50.

The deck support 14 shown in FIG. 4 further includes a support element 200 coupled (e.g., attached) to the deck support 14. The support element 200 is configured to stabilize the support structure 184. In the embodiment shown in FIG. 4, the support element 200 is disposed between the mounting plate 12 and the deck support 14. Specifically, the support element 200 is disposed between the support structure 184 and the front side 36 of the mounting plate 12. As shown in FIG. 4, the support element 200 is fastened to the front side 36 of the mounting plate 12, an apparatus configuration suitable for using the support element 200 as a handle to transport the deck support 14 into and out of a tree. Alternatively, the support element 200 may be removably disposed in a recessed area 202 on the mounting plate 13, for example, as shown in the embodiment of FIGS. 9 and 10. A configuration where the support element 200 is removably disposed on at least one of the mounting plate 12 and deck support 14 would be particularly useful for an apparatus configuration where the deck support 14 is removably disposed on the mounting plate 12.

As shown in FIG. 6, the deck support 14 may also include a pair of side covers 62, 64 that extend between the front side 36 of the mounting plate 12 and the support structure 184. The deck support 14 may also include at least one locating member 204 that is oriented perpendicular the upper surface 50 of the deck support 14. The locating member(s) 204 are configured to secure the deck 16 in a fixed position relative the mounting plate 12 and deck support 14. Among the various possibilities, the locating member(s) 204 may take the form of a stud having identical cross-sections normal to the axis of the stud. Alternatively, the locating member(s) 204 may be conical or tapered; for example, the locating member(s) 204 may be shaped similar to a retaining body 251 as shown in FIG. 1, the retaining body 251 having a larger diameter proximal the deck support 14 to simplify alignment between the locating member(s) 204 and the deck 16 and to reduce freedom-of-movement of the deck 16 with respect to the deck support 14 once assembled. As shown in FIG. 6, the locating member(s) 204 may include a cross-hole 206 sized to accommodate a snap ring, pin, or other fastener configured to prevent a user from removing the deck 16. Alternatively the deck 16 may be fastened to the deck support 14 directly, for example, using screws, nails, or other fastening means.

Figure 17:
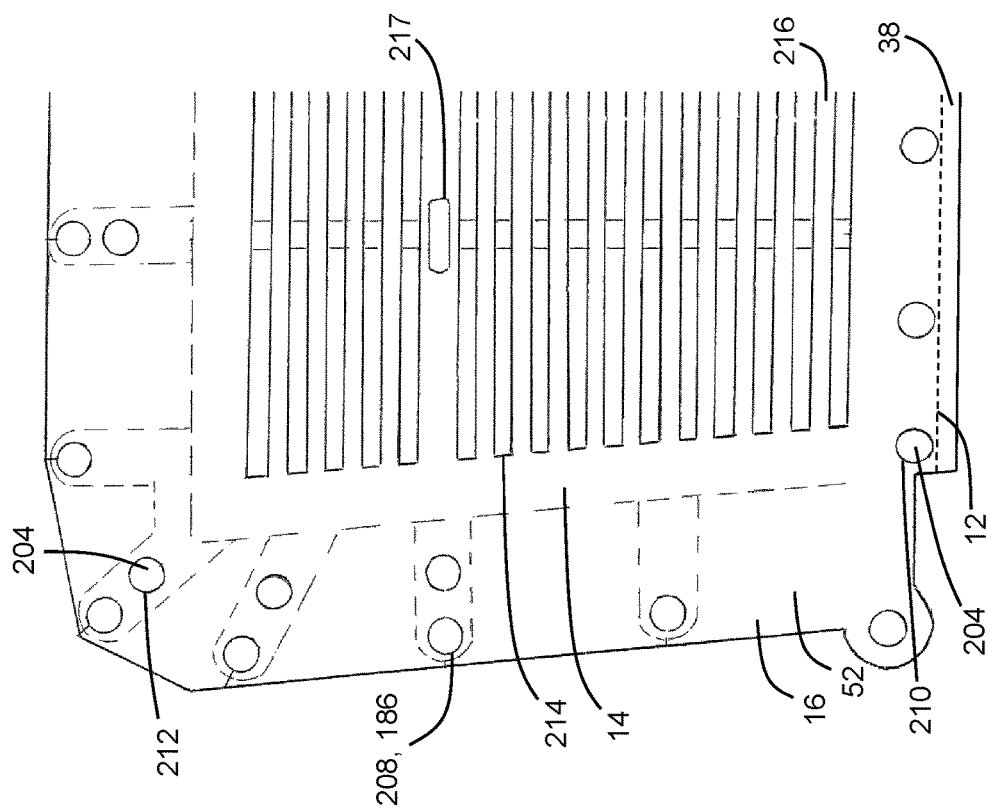
FIG. 17 is a top view of a deck for a modular tree stand, according to an illustrative embodiment.

FIG. 17 shows a top view of a portion of the deck 16. FIG. 17 also shows the relative location of the underlying deck support 14 and the upper axial end 38 of the mounting plate 12. As shown in FIG. 17, the deck 16 includes a plurality of holes 208 disposed on the upper surface 52 of the deck 16 that extend entirely through the deck 16. At least one of the plurality of holes 208 is configured to align with a corresponding one of the plurality of holes 186 in the deck support 14, such that at least a portion of one of the plurality of holes 186 in the deck support 14 may be viewed through a corresponding one of the plurality of holes 208 in the deck 16. In the embodiment shown in FIG. 17, holes 210 and 212 are configured to receive the locating member 204 on the deck support 14.

As shown in FIG. 17, the deck 16 may also include an aperture 214 disposed centrally thereon. A plurality of louvers 216 may be disposed in the aperture 214. In the embodiment shown in FIG. 17, the louvers 216 are oriented perpendicular to the upper surface 52 of the deck 16. Alternatively, the louvers 216 may be angled with respect to the upper surface 52. The deck 16 also includes deck handle 217, centrally disposed on one of the louvers 216. Alternatively, the deck handle 217 may take the form of a u-shaped extension that is fastened to any part of the deck 16.

Figure 18:
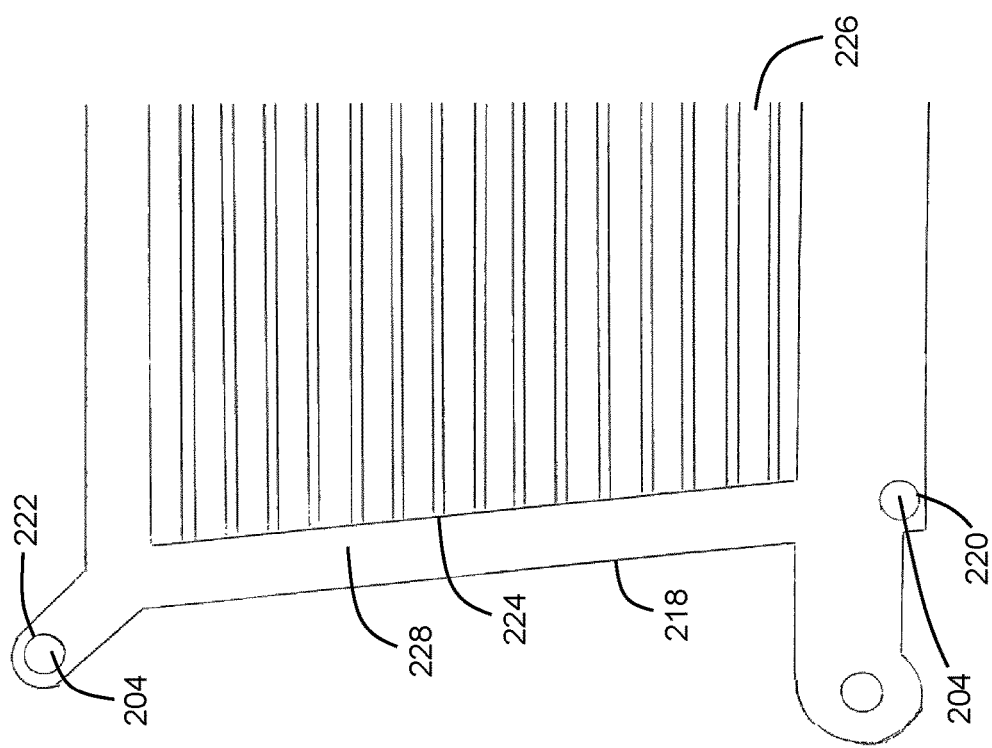
FIG. 18 is a top view of a deck for an accessory support system, according to an illustrative embodiment.

An alternative embodiment of a deck 218 is shown in FIG. 18. As shown in FIG. 18, the deck 218 includes holes 220, 222 configured to receive the locating member(s) 204 on the deck support 14. The deck 218 also includes an aperture 224 disposed centrally thereon. As shown in FIG. 18, the deck 218 includes a plurality of louvers 226 disposed in the aperture 224, which allows a flow of air to pass through the deck 218. The louvers 226 may be angled to completely obscure the view through the aperture 224. In the embodiment of FIG. 18, the louvers 226 are angled 30° relative a plane that is parallel to the upper surface 228 of the deck 218. In alternative embodiments, any other suitable angle may be utilized. An apparatus configuration utilizing the embodiment of the deck 218 shown in FIG. 18 could be combined with an existing tree stand to serve as a vertical blind for a user.

Figure 5:
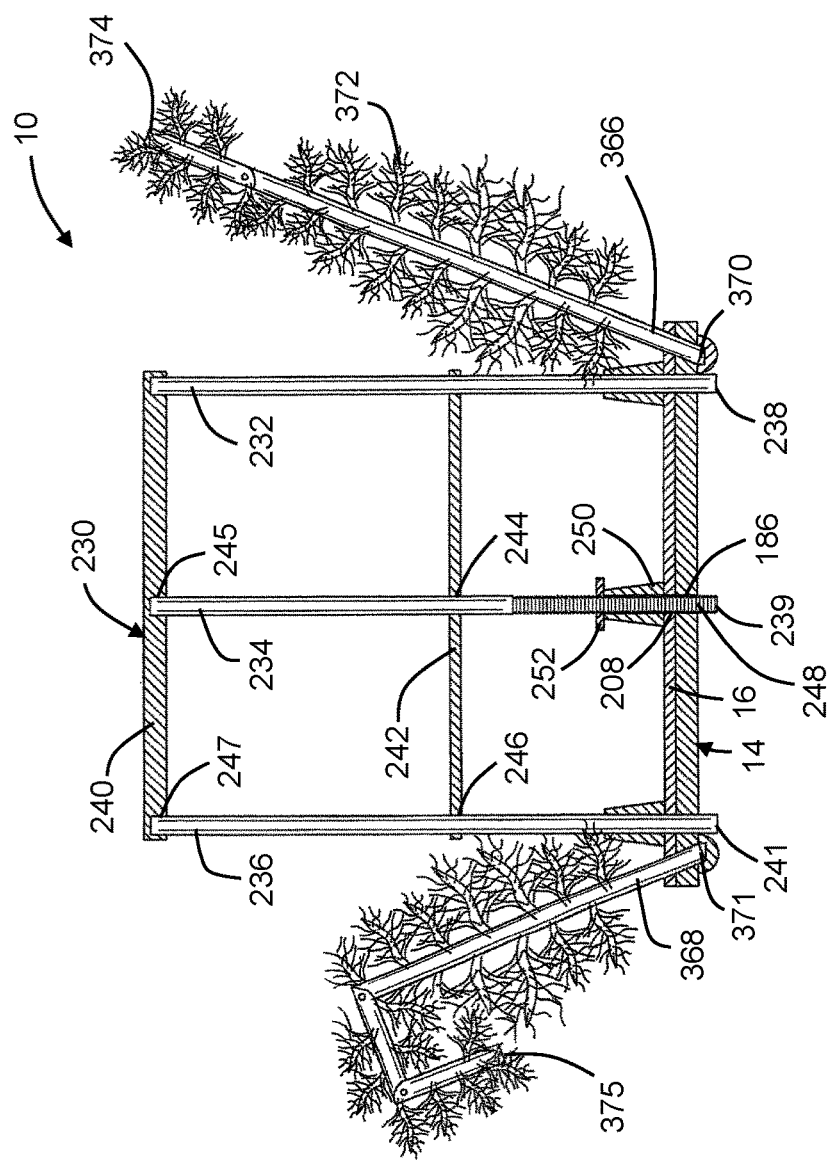
FIG. 5 is a rear view of the modular tree stand of FIG. 2 at a cross-section through a series of support posts for a helper rail.

Returning now to the embodiment of FIGS. 1 through 5, the modular tree stand 10 may further include a height adjustable helper rail 230 (as shown in FIG. 1) that is removably connected to the deck 16 and deck support 14. Among various benefits, the helper rail 230 provides a stable surface against which a weapon or other accessory may be positioned. The helper rail 230 also functions as a safety gate to prevent a user from falling off of the modular tree stand 10. FIG. 5 shows a rear view of the helper rail 230 at a cross-section V-V from FIG. 4. As shown in FIG. 5, the helper rail 230 includes a plurality of substantially parallel posts, a left side post 232, a center post 234, and a right side post 236 (orientation when viewed from the front of the modular tree stand 10). The helper rail 230 is configured to be at least partially disposed on the deck support 14. As shown in the embodiment of FIG. 5, an outer end 238, 239, 241 of each of the posts 232, 234, 236 is configured to be received into one of the holes 208 and a corresponding one of the holes 186 passing through the deck 16 and the deck support 14, respectively.

Figure 19:
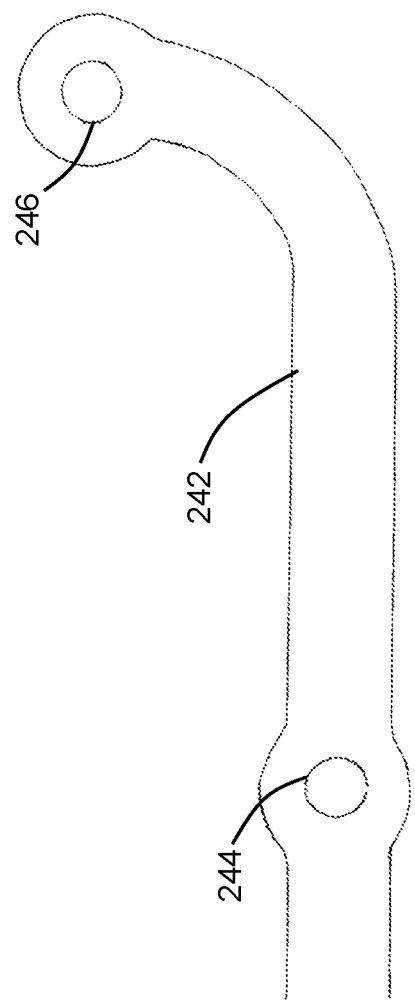
FIG. 19 is a top view of a symmetrical portion of a lower support rail, according to an illustrative embodiment.

The helper rail 230 further includes at least one support rail 240, 242, oriented substantially perpendicular to the plurality of posts 232, 234, 236. As shown in FIG. 5, each support rail 240, 242 extends from the left side post 232 to the right side post 236. In the embodiment shown in FIG. 5, the helper rail 230 includes an upper support rail 240, and a lower support rail 242. A top view of a symmetrical portion of the lower support rail 242 is shown in FIG. 19. As shown in FIG. 19, the lower support rail 242 includes post openings 244, 246 that are configured to receive one of the parallel posts 232, 234, 236 (the parallel posts 232, 234, 236 are shown in FIG. 5). In FIG. 19, the lower support rail 242 is curved proximal the post opening 246. Alternatively, the lower support rail 242 may be straight across or any other shape suited to the position of the parallel posts 232, 234, 236. As shown in FIG. 5, the upper support rail 240 may be similar to the lower support rail 242, but may include recessed portions 245, 247 in place of the post openings 244, 246.

Figure 20:
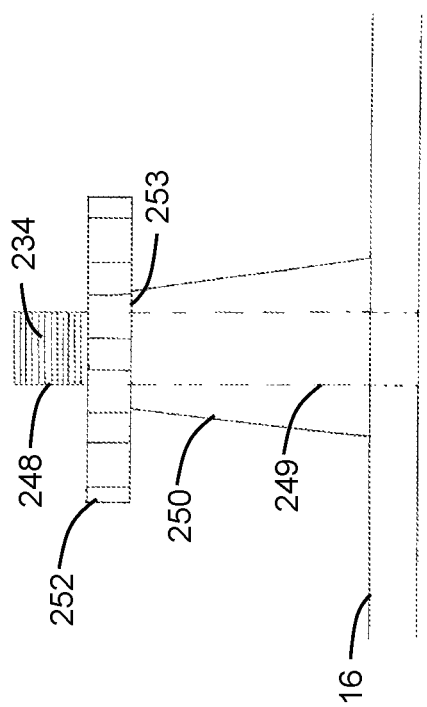
FIG. 20 is an enlarged front view of an adjustment portion of a post for a helper rail.
Figure 21:
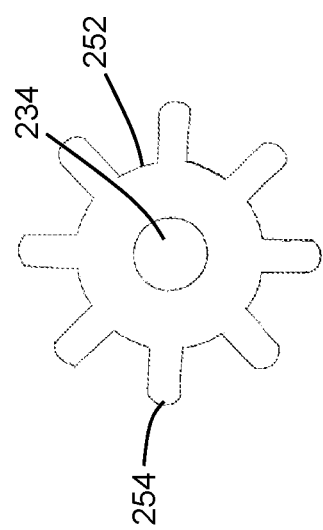
FIG. 21 is a top view of an adjustment nut from FIG. 20.

Returning to FIG. 5, the helper rail 230 includes at least one post that is height adjustable. In the embodiment of FIG. 5, the center post 234 is height adjustable. Various adjustment mechanisms are contemplated. For example, as shown in FIG. 5, the center post 234 may include an adjustment portion 248 disposed its outer end 239, proximal a retaining body 250. Various mounting configurations are contemplated. In the embodiment of FIG. 5, the retaining bodies 250 are fastened to the deck 16 using screws, bolts or any other suitable fastener. Alternatively, the retaining bodies 250 may include a threaded end that interfaces with threaded holes in at least one of the deck 16 and deck support 14. Alternatively, the retaining bodies 250 may be affixed to the deck 16 or deck support 14 using a suitable adhesive. In an embodiment where the retaining bodies 250 are fastened to the deck support 14, the retaining bodies could also be used to secure the deck 16 relative the deck support 14; for example, by including holes in the deck 16 that are configured to receive the retaining bodies 250. Using retaining bodies 250 that are frustoconical as shown in FIG. 5 would simplify the initial alignment between the holes in the deck 16 and the retaining bodies 250, while preventing movement of the deck 16 in a lateral direction (e.g., perpendicular to the front side of the mounting plate) in an apparatus configuration where the retaining bodies 250 are fully received by the deck 16. An adjustment nut 252 may be disposed on the adjustment portion 248 of the center post 234. Specifically, as shown in FIG. 5, the adjustment portion 248 may be threaded to receive an adjustment nut 252. FIG. 20 shows an enlarged view of the adjustment portion 248, which extends through an enlarged hole 249 in the retaining body 250. The adjustment nut 252 may configured to be positioned atop one of the retaining body 250 and the deck support 14. As shown in FIG. 20, the adjustment nut 252 contacts an upper surface 253 of the retaining body 250. As the adjustment nut 252 rotates, the height of the center post 234 relative the deck 16 changes. As shown in FIG. 5, the left side post 232 and the right side post 236 are connected to the center post 234 via the support rails 240, 242. Hence, adjusting the height of the center post 234 also changes the height of the helper rail 230. FIG. 21 shows a top view of the adjustment nut 252. In the embodiment shown in FIG. 21, the adjustment nut 252 advantageously includes a series of tabs 254 oriented perpendicular the center post 234 that extend away from the center post 234. The tabs 254 allow for hand adjustment of the height of the helper rail 230 by a user (also see FIG. 5).

As shown in FIGS. 1 and 2, the modular tree stand 10 may further include a cross-stabilizer bar 256 configured to be disposed between the upper ends 23, 25 of the pair of support members 18, 20. As shown in FIG. 2, the cross-stabilizer bar 256 has a first end 258 and a second end 260. The first end 258 is configured to pivotably attach to a retaining body 33 proximal the upper end 25 of the second support member 20 via pivot member 262. In the embodiment shown in FIGS. 1 and 2, the cross-stabilizer bar 256 is configured to pivot upwardly at the pivot member in a plane that is substantially parallel to the axis of the support members 18, 20. The second end 260 of the cross-stabilizer bar 256 is configured to contact a supporting interface 264 disposed on retaining body 32. In the embodiment shown in FIGS. 1 and 2, the cross-stabilizer bar 256 may be configured in a closed condition and an open condition. In the closed condition the second end 260 of the cross-stabilizer bar 256 is disposed proximal the supporting interface 264, whereas in the open condition, the second end 260 of the cross-stabilizer bar 256 is spaced apart from the supporting interface 264.

Figure 22:
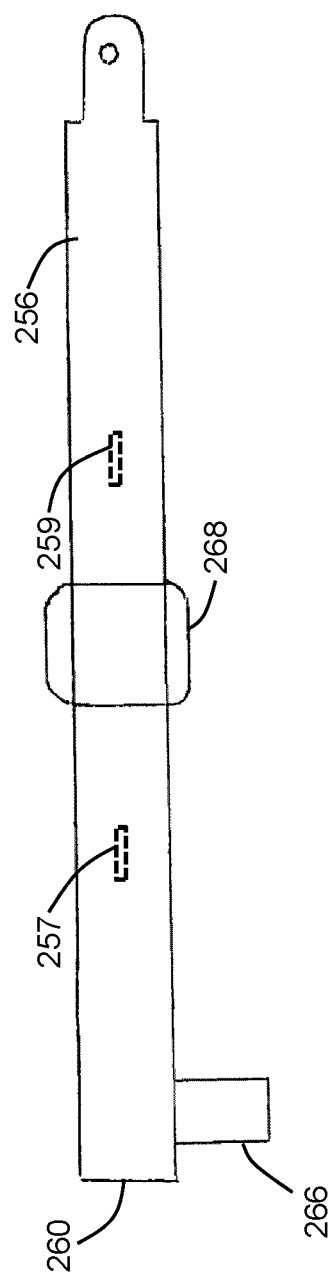
FIG. 22 is a front view of a cross-stabilizer bar, according to an illustrative embodiment.

A front view of the cross-stabilizer bar 256 isolated from the other components is shown in FIG. 22. As shown in FIG. 22, the cross-stabilizer bar 256 may include an interface rod 266 disposed on its second end 260. In the embodiment in FIG. 22, the interface rod 266 is oriented perpendicular the cross-stabilizer bar 256 and is configured to be insertable into supporting interface 264 (also see FIG. 2). The cross-stabilizer bar 256 also includes two eyebolts 257, 259 distributed evenly along the length of the cross-stabilizer bar 256 and disposed on a tree side of the cross-stabilizer bar 256. The eyebolts 257, 259 are configured to receive a hook from a tree strap, bungee, or other support strap that may further secure the cross-stabilizer bar 256 and support members 18, 20 (also see FIGS. 1 and 2) to a tree or other structure. Alternatively, the eyebolts 257, 259 may be replaced with mounting slots that extend through the cross-stabilizer bar 256 or another suitable mounting feature. A variety of accessories may be attached to the cross-stabilizer bar 256, for example, the cross-stabilizer bar 256 shown in FIG. 22 includes an LED light 268 disposed centrally along the cross-stabilizer bar 256.

Figure 23:
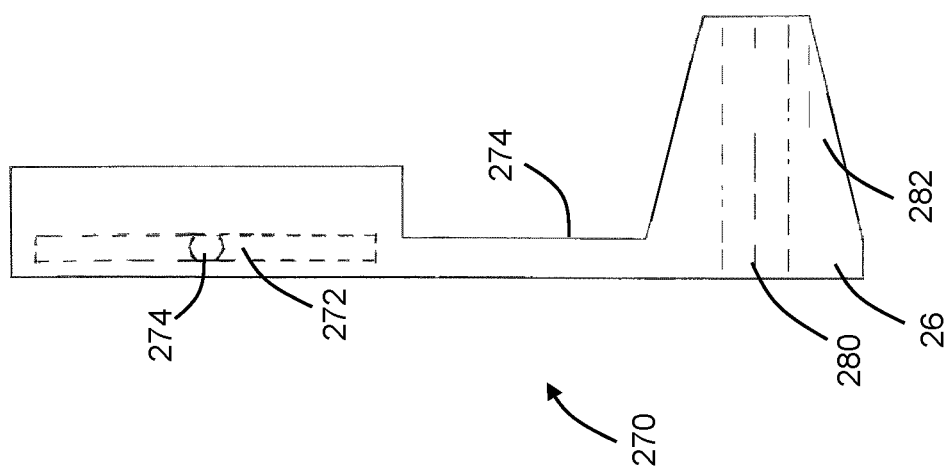
FIG. 23 is a side view of part of a gun holder, according to an illustrative embodiment.
Figure 24:
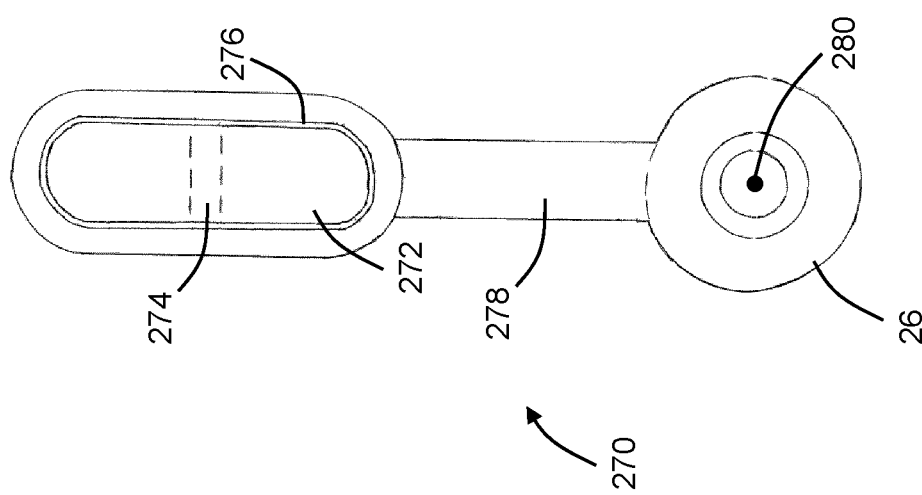
FIG. 24 is a top view of the part of the gun holder of FIG. 23.

As shown in FIG. 1, the modular tree stand 10 also includes a gun holder 270, which further includes a lower retaining body 26 disposed proximal the lower end 19 of the first support member 18 and an upper retaining body 28 disposed proximal the upper end 23 of the first support member 18. A side view and a top view of the lower retaining body 26 is shown in FIGS. 23 and 24, respectively. The gun holder 270 includes a recessed area 272 shaped for receiving the stock of a gun. The gun holder 270 may also include a swivel 274 disposed in the recessed area 272 to orient the stock of the gun and to prevent the gun from moving around within the boundaries 276 (as shown in FIG. 24) of the recessed area 272. The recessed area 272 is attached to the lower retaining body 26 by a lateral extension piece 278 oriented perpendicular to a central axis 280 of the lower retaining body 26. The features of the lower retaining body 26 could be implemented on any one of the other retaining bodies shown in FIG. 1; for example, the lateral extension piece 278 and recessed area 272 connected thereto could be disposed on the front side of retaining body 22. Advantageously, this configuration could further stabilize the gun holder 270 against the deck 16 or deck support 14.

Figure 25:
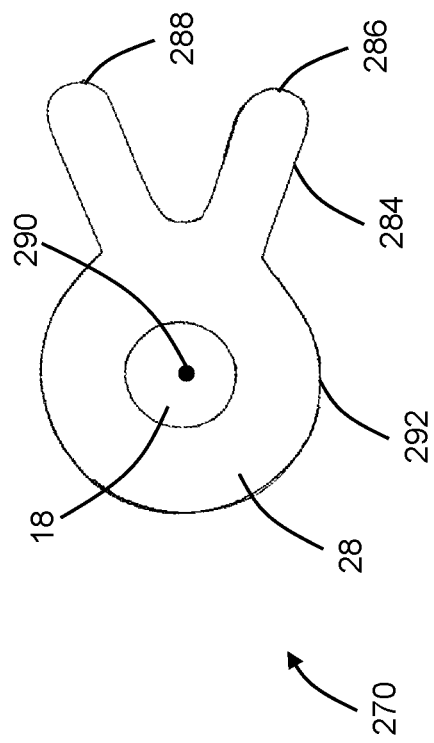
FIG. 25 is a top view of a part of a gun holder, according to an illustrative embodiment.

FIG. 25 shows a top view of the upper retaining body 28. As shown in FIG. 25, the gun holder 270 includes a barrel hook 284 disposed on the upper retaining body 28. The barrel hook 284 takes the form of two prongs 286, 288 oriented perpendicular to the central axis 290 of the upper retaining body 28 that extend from outer diameter 292 of the upper retaining body 28. As shown in FIG. 2, the barrel hook 284 is configured to maintain the barrel of a gun in a direction that is substantially parallel to the first support member 18. Alternatively, the gun holder 270 (shown in FIG. 1) may be disposed on the second support member 20.

Figure 26:
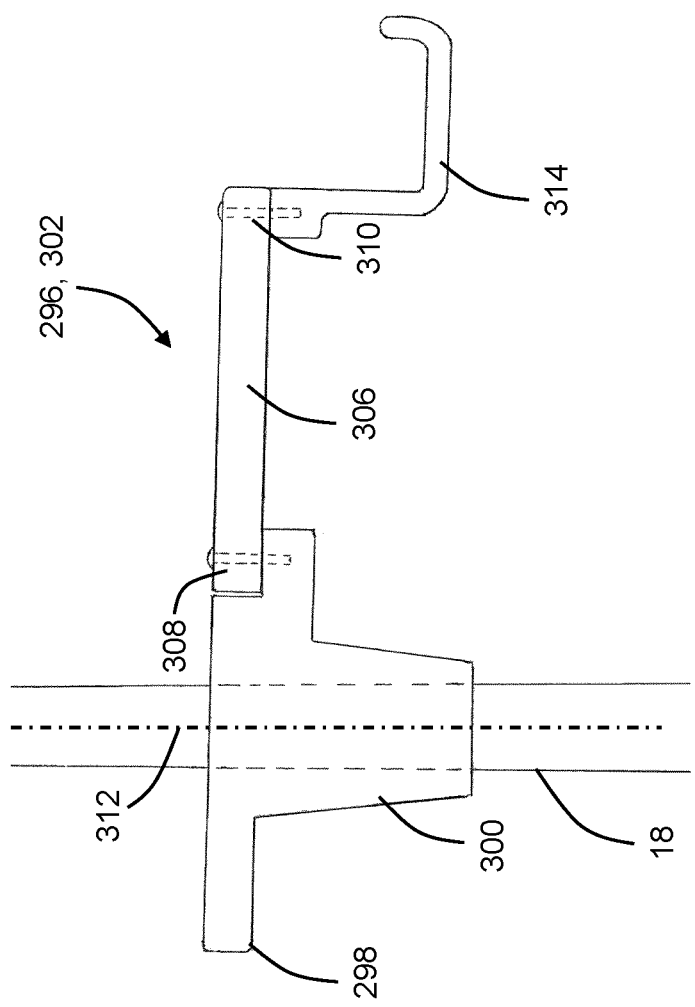
FIG. 26 is a side view of a combination gun and bow holder, according to an illustrative embodiment.

As shown in FIG. 1, the modular tree stand 10 also includes a bow hanger 294. The bow hanger 294 shown in FIG. 1 includes its own retaining body 30 disposed on the second support member 20. Alternatively, as shown in FIG. 26, the bow hanger 296 may be integrated with a retaining body 300 that also includes a barrel hook 298 to simultaneously function as a bow hanger 296 and as part of the gun holder 302. FIG. 26 shows a side view of an embodiment of a retaining body 300 that incorporates features of both a gun holder 302 and a bow hanger 296 on the first support member 18. The assembly includes a spacer arm 306 having a retaining end 308 and a hook end 310. As shown in FIG. 26, the retaining end 308 is pivotably attached to the retaining body 300 and is configured to pivot in a plane that is substantially perpendicular to the axis 312 of the first support member 18. Similarly, a hook 314 is pivotably disposed on the hook end 310 of the spacer arm 306, such that the hook 314 may also pivot in a plane that is substantially perpendicular to the axis 312 of the first support member 18. As shown in FIG. 26, a barrel hook 298 is disposed on the retaining body 300 at a circumferential position on the retaining body 300 that is opposite the spacer arm 306.

Figure 27:
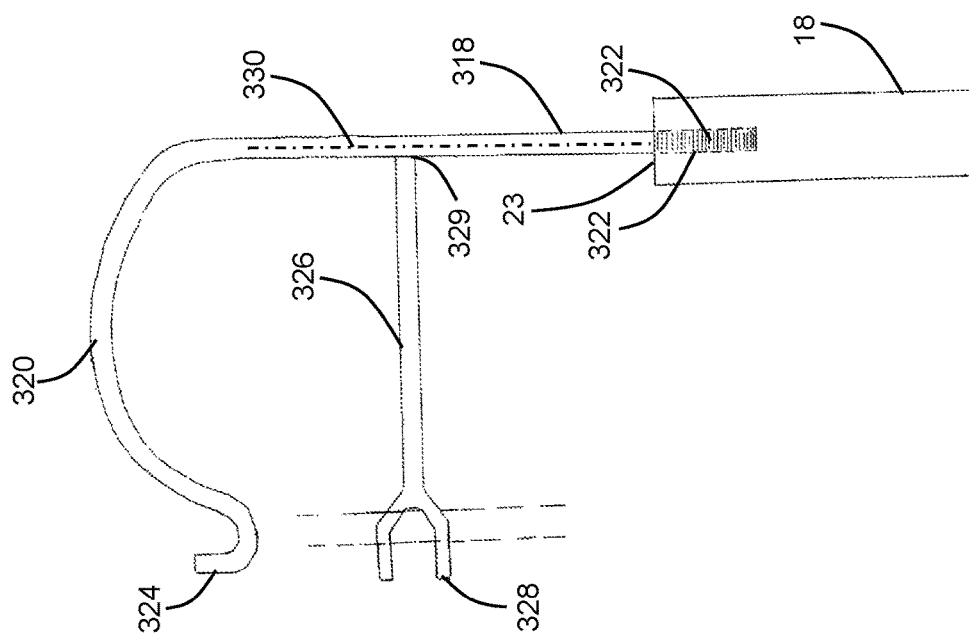
FIG. 27 is an umbrella holder, according to an illustrative embodiment.

FIGS. 1 and 2 show an umbrella holder 318 that disposed on the first support member 18. FIG. 27 shows an enlarged rear view of the umbrella holder 318. As shown in FIG. 27, the umbrella holder 318 includes a curved rod 320 having a threaded end 322 and a support end 324. The umbrella holder may further include an umbrella pole support rod 326 having a forked end 328 and an unforked end 329. As shown in FIG. 27, the unforked end 329 of the umbrella pole support rod 326 is disposed on the curved rod 320 proximal the threaded end 322. The umbrella pole support rod 326 is oriented substantially perpendicular to the axis 330 of the curved rod 320 in at least one location. The support end 324 of the curved rod 320 latches to part of the umbrella, while the umbrella pole support rod 326 maintains the umbrella at a user specified orientation. As shown in FIG. 27, the threaded end 322 of the curved rod 320 is received within a threaded umbrella support hole 332 at the upper end 23 of the first support member 18. Alternatively, umbrella holder 318 may be attached to the upper end 25 of the second support member 20 (see also FIGS. 1 and 2).

Figure 28:
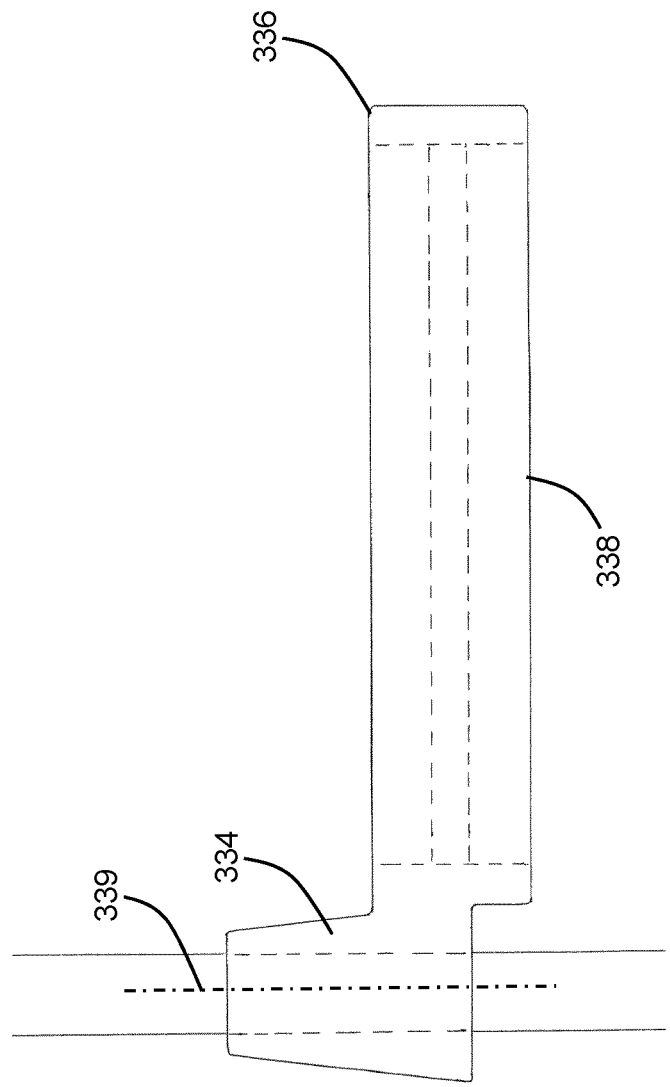
FIG. 28 is a retaining body with an integrated table, according to an illustrative embodiment.
Figure 29:
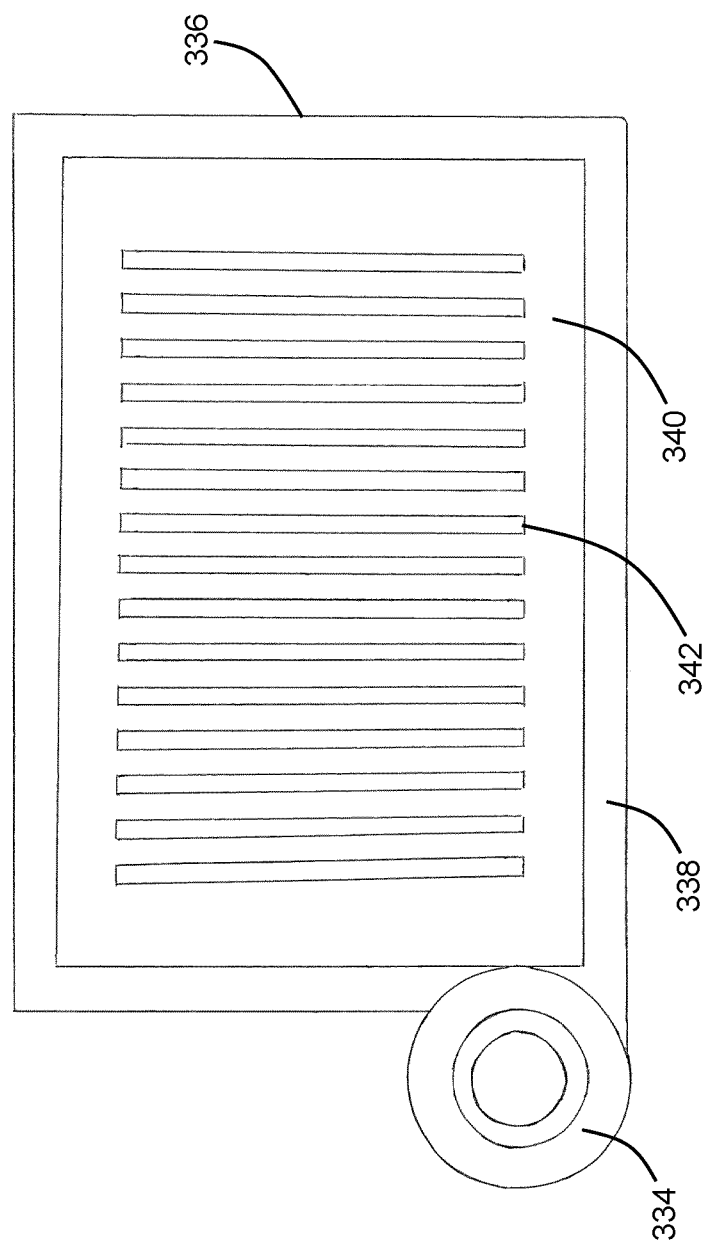
FIG. 29 is a top view of the retaining body of FIG. 28.

Various other accessory supports may be integrated with a retaining body. For example, a retaining body may be adapted for use as a table or to accommodate various other user accessories. FIG. 28 shows a side view of a retaining body 334 adapted for use as a table 336. The table 336 includes an extension 338 oriented perpendicular to the axis 339 of the retaining body 334. FIG. 29 shows a top view of the table 336. As shown in FIG. 29, the extension 338 includes a recessed section 340. A plurality of rectangular slots 342 are disposed on the recessed section 340. Among other functions, the rectangular slots 342 allow water to drain from the recessed section 340.

In any of the above embodiments, the retaining bodies 22, 24, 26, 28, 30, 32, 33, 250, 300, 334 may be secured to the support members 18, 20 (shown in FIGS. 1 and 2) using O-rings, pins, or other fastening means. Additionally, the retaining bodies 22, 24, 26, 28, 30, 32, 33, 250, 300, 334 may be located on other supports connected to the modular tree stand 10 (e.g., any one of the plurality of parallel posts 232, 234, 236 shown in FIG. 5 for the helper rail 230).

Figure 30:
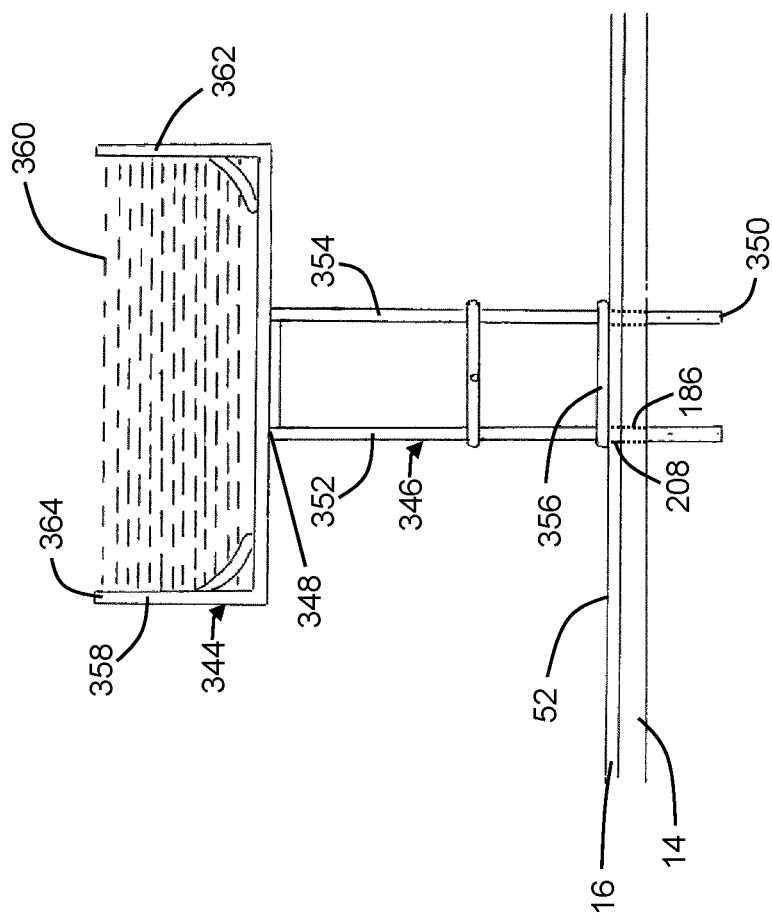
FIG. 30 is a front view of a seat and seat support, according to an illustrative embodiment.
Figure 31:
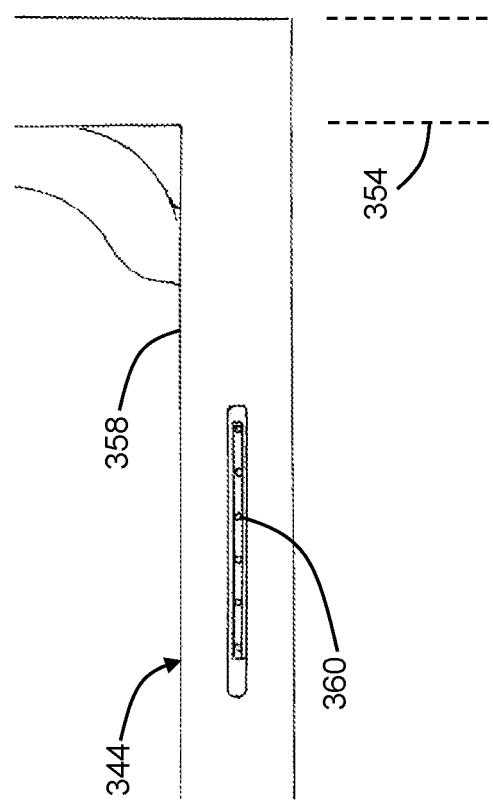
FIG. 31 is a side view of the seat and seat support of FIG. 30.

As shown in FIGS. 1 and 2, the modular tree stand 10 may further comprise a seat 344 and a seat support 346 that together can comfortably accommodate a user during prolonged periods in the modular tree stand 10. FIG. 30 shows an enlarged front view of the seat 344 and seat support 346 of FIGS. 1 and 2. The seat support 346 includes two vertical posts 352, 354 and a cross-bar 356 that extends between the vertical posts 352, 354. As shown in FIG. 30, the cross-bar 356 contacts the upper surface 52 of the deck 16, thereby setting the height of the seat 344 relative the deck 16. The seat support 346 includes a seat end 348 and a mounting end 350. The seat 344 is pivotably disposed on the seat end 348 of the seat support 346. When assembled to the modular tree stand 10 (shown in FIGS. 1 and 2), the mounting end 350 (shown in FIG. 30) of the seat support 346 is received in holes 208 and a corresponding one of the holes 186 disposed in the deck 16 and the deck support 14, respectively. Alternatively, the mounting end 350 of the seat support 346 may be received in one or more holes (not shown) in the mounting plate and one or more holes 61 in the slide bar 58. In the embodiment of FIG. 30, the seat 344 is configurable in a folded position and an alternate in-use position. In FIG. 30, the seat is shown in a folded position. In the folded position, the seat 344 is oriented in a direction that is substantially parallel with respect to the vertical posts 352, 354 of the seat support 346. FIG. 31 shows a side view of the seat 344 rotated to an in-use position, in which the seat 344 is oriented in a direction that is substantially perpendicular with respect to the vertical posts 352, 354, or substantially parallel with the deck 16 (shown in FIG. 1). The seat support 346 may also include a mounting interface 347 configured to attach to an accessory; for example, the mounting interface 347 could secure a portable toilet to the seat support 346. The mounting interface 347 may take the form of a bolt inserted in a threaded hole, a clip connector, or any other suitable hole or fastener.

The seat 344 further comprises a seat frame 358 and a webbed user rest 360 disposed thereon. As shown in FIG. 30, the webbed user rest 360 extends between a left frame member 362 and a right frame member 364. Various materials are contemplated for the webbed user rest 360; for example, the webbed user rest 360 may be made from chord, caning materials, or any other materials suitable for an outdoor tree stand seat.

Figure 32:
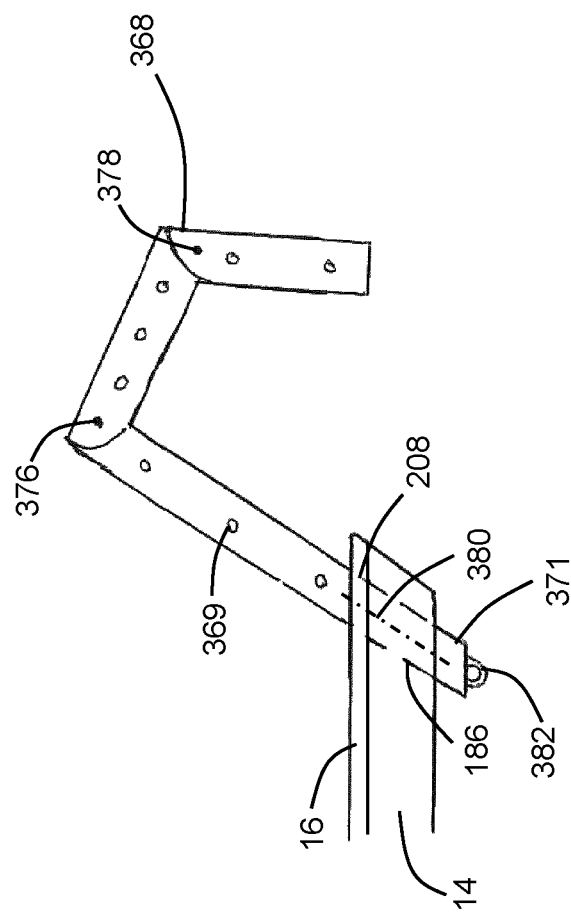
FIG. 32 is a side view of a blind branch assembled to a modular tree stand, according to an illustrative embodiment.

Referring to FIG. 2, the modular tree stand 10 may further include at least one blind branch 366, 368 engagable with at least one of the mounting plate 12, retaining body 22, 24, deck support 14, and deck 16. FIG. 15 shows a blind branch 365 received within the third support hole 160 in retaining body 24. In the embodiments of FIG. 2, two blind branches 366, 368 are disposed in the modular tree stand 10. FIG. 5 shows a rear view of the modular tree stand 10 along the cross-section V-V shown in FIG. 4. As shown in FIG. 5, a lowermost end 370, 371 of each of the two blind branches 366, 368 is engagable with at least one of the holes 208 and a corresponding one of the holes 186 disposed in the deck 16 and the deck support 14, respectively. Each blind branch 366, 368 may include a series of blind elements 372 disposed between a lowermost end 370, 371 of the blind branches 366, 368 and an uppermost end 374, 375 of the blind branches 366, 368. FIG. 32 shows an enlarged side view of a blind branch 368 according to an illustrative embodiment. The blind branch 368 may include at least one pivot member 376, 378 disposed between the lowermost end 371 and the uppermost end 375. In the embodiment of FIG. 32, the blind branch 368 includes two pivot members 376, 378. Each pivot member 376, 378 allows the blind branch 368 to tilt with respect to a primary axis 380 of the blind branch 368. Among other advantages, the pivot members 376, 378 allow a user to customize the layout of the modular tree stand 10 (see FIG. 5) while observing or hunting game.

As shown in FIG. 32, the blind branch 368 may also include a series of perforations 369 oriented in a direction that is substantially perpendicular to the primary axis 380 of the blind branch 368. These perforations may be configured to accommodate wire, tie straps, or other tethering means to secure blind elements 372 (see FIG. 5) to the blind branch 368. As shown in FIG. 1, in an alternative embodiment a series of perforations 373 could also be included on at least one support member 20. Again, these perforations 373 would be oriented in a direction that is substantially perpendicular to the axis of the support member(s) 20.

Referring again to FIG. 32, the blind branch 368 may be tapered on its lowermost end 371 to a diameter that is slightly greater than the holes 208 in the deck 16 or the holes 186 in the deck support 14 (not shown) to set the position of the blind branch 368 relative the deck 16. In the embodiment shown in FIG. 31, the blind branch 368 also includes an eyebolt 382 disposed in the lowermost end 371. Among other uses, the eyebolt 382 may be utilized to assist a user in transporting a plurality of blind branches 366, 368 into and out of a tree. Alternatively, the eyebolt 382 may be replaced with a slot through the lowermost end 371 or other tether fastener.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. An accessory support system configured for use with a tree stand comprising:
   a mounting plate, the mounting plate having a tree facing side, a front side opposite the tree facing side, an upper axial end, a lower axial end, a first circumferential end, and a second circumferential end, wherein the upper axial end is configured to be spaced a distance along a trunk of a tree from the lower axial end;
   a stabilizing bar disposed on the mounting plate, wherein at least part of the stabilizing bar extends beyond the tree facing side;
   a mounting member configured to attach the mounting plate to a tree;
   a first support member comprising a lower end and an upper end;
   a first opening disposed on the mounting plate, the first opening configured to receive the lower end of the first support member, the first opening proximal the first circumferential end, wherein an axis of the first opening is oriented in a direction that is substantially perpendicular to at least one of the upper axial end and the lower axial end, and wherein the support member comprises an accessory support pole;
   a plurality of leveling holes disposed in the mounting plate;
   a plurality of fasteners, wherein each of the fasteners is configured to engage with a corresponding one of the leveling holes;
   a retaining body, wherein the retaining body is configured to be disposed on the first support member, wherein the retaining body is configured to position the first support member relative to the mounting plate; and
   a gun holder disposed on the first support member, the gun holder comprising a lower retaining body disposed proximal the lower end of the first support member, a recessed area shaped for receiving a stock of a gun, and a lateral extension piece therebetween, the gun holder further comprising an upper retaining body disposed proximal the upper end of the first support member and having a barrel hook disposed thereon, wherein the barrel hook is configured to maintain a barrel of a gun in a direction that is substantially parallel to the first support member.

2. The accessory support system of claim 1, the retaining body with the barrel hook further comprising a spacer arm having a retaining end and a hook end, wherein the retaining end is pivotably attached to the retaining body and is configured to pivot in a plane that is substantially perpendicular to the axis of the first support member, and a hook shaped for supporting a bow is disposed on the hook end.

3. The accessory support system of claim 1 further comprising a second opening disposed on the mounting plate, the second opening proximal the second circumferential end, wherein the axis of the second opening is oriented in a direction that is substantially parallel to the axis of the first opening.

4. The accessory support system of claim 3 further comprising:
a pair of support members including the first support member and a second support member, the second support member having an upper end and a lower end, wherein the lower end of each of the support members is configured to be received in one of the first opening and the second opening;
two retaining bodies, wherein each retaining body is configured to be disposed on a corresponding one of the support members,
wherein:
each retaining body is configured to set the position of one of the support members relative the mounting plate.

5. The accessory support system of claim 4 further comprising:
a cross-stabilizer bar configured to be disposed between the upper ends of the support members, the cross-stabilizer bar having a first end and a second end;
a supporting interface disposed proximal the upper end of the first support member; and
a pivot member disposed proximal the upper end of the second support member,
wherein:
the cross-stabilizer bar is configured to pivot upwardly at the pivot member in a plane that is substantially parallel to the axis of one of the support members.

6. An accessory support system configured for use with a tree stand comprising:
a mounting plate, the mounting plate having a tree facing side, a front side opposite the tree facing side, an upper axial end, a lower axial end, a first circumferential end, and a second circumferential end, wherein the upper axial end is configured to be spaced a distance along a trunk of a tree from the lower axial end;
a stabilizing bar disposed on the mounting plate, wherein at least part of the stabilizing bar extends beyond the tree facing side;
a mounting member configured to attach the mounting plate to a tree;
a first opening disposed on the mounting plate, the first opening configured to receive a support member, the first opening proximal the first circumferential end, wherein an axis of the first opening is oriented in a direction that is substantially perpendicular to at least one of the upper axial end and the lower axial end, and wherein the support member comprises an accessory support pole;
a plurality of leveling holes disposed in the mounting plate;
a plurality of fasteners, wherein each of the fasteners is configured to engage with a corresponding one of the leveling holes; and
a slide arm disposed on the mounting plate proximal the lower axial end, wherein at least part of the slide arm extends beyond at least one of the first circumferential end and the second circumferential end; and
a third opening disposed on the slide arm, wherein the axis of the third opening is configured to be substantially coaxial with the axis of the first opening.

7. The accessory support system of claim 6, wherein the slide arm is configured to move relative the mounting plate between an extended position in which the third opening is extended away from the mounting plate, and a retracted position in which the third opening is positioned adjacent to at least one of the first circumferential end and the second circumferential end.

8. The accessory support system of claim 7, further comprising a locking handle, wherein the locking handle is configured to secure the slide arm in at least one position.

9. An accessory support system configured for use with a tree stand comprising:
a mounting plate, the mounting plate having a tree facing side, a front side opposite the tree facing side, an upper axial end, a lower axial end, a first circumferential end, and a second circumferential end, wherein the upper axial end is configured to be spaced a distance along a trunk of a tree from the lower axial end;
a stabilizing bar disposed on the mounting plate, wherein at least part of the stabilizing bar extends beyond the tree facing side;
a mounting member configured to attach the mounting plate to a tree;
a first opening disposed on the mounting plate, the first opening configured to receive a support member, the first opening proximal the first circumferential end, wherein an axis of the first opening is oriented in a direction that is substantially perpendicular to at least one of the upper axial end and the lower axial end, and wherein the support member comprises an accessory support pole;
a plurality of leveling holes disposed in the mounting plate;
a plurality of fasteners, wherein each of the fasteners is configured to engage with a corresponding one of the leveling holes; and
a deck support disposed on the mounting plate, the deck support having an upper surface and a support element, wherein the support element is disposed between the mounting plate and the deck support; and
a helper rail having a plurality of substantially parallel posts and a support rail perpendicular to the posts, wherein the helper rail is configured to be at least partially disposed on the deck support, the posts comprising a right side post and a left side post, wherein the support rail extends from the right side post to the left side post, wherein at least one of the posts is height adjustable, wherein at least one of the posts further comprises an adjustment portion disposed on its outer end and an adjustment nut disposed thereon, wherein the adjustment nut is configured to be positioned atop one of a retaining body and the deck support, wherein the adjustment nut sets the height of the support rail relative to the deck support.

10. The accessory support system of claim 9 further comprising a deck disposed proximal the upper surface, and at least one locating member configured to secure the deck in a fixed position relative the mounting plate and the deck support.

11. The accessory support system of claim 10 further comprising a seat and a seat support, the seat support having a seat end and a mounting end, wherein the seat is pivotably disposed on the seat end and the mounting end is configured to engage with at least one of the mounting plate, the deck support, and the deck.

12. The accessory support system of claim 10, the deck further comprising an aperture and a plurality of louvers disposed in the aperture, wherein at least one louver is angled with respect to the upper surface.

13. The accessory support system of claim 10 further comprising a plurality of holes in the deck support and deck, wherein at least one of the plurality of holes in the deck support is configured to align with a corresponding one of a plurality of holes in the deck.

14. An accessory support system configured for use with a tree stand comprising:
- a mounting plate, the mounting plate having a tree facing side, a front side opposite the tree facing side, an upper axial end, a lower axial end, a first circumferential end, and a second circumferential end, wherein the upper axial end is configured to be spaced a distance along a trunk of a tree from the lower axial end;
- a stabilizing bar disposed on the mounting plate, wherein at least part of the stabilizing bar extends beyond the tree facing side;
- a mounting member configured to attach the mounting plate to a tree;
- a first opening disposed on the mounting plate, the first opening configured to receive a support member, the first opening proximal the first circumferential end, wherein an axis of the first opening is oriented in a direction that is substantially perpendicular to at least one of the upper axial end and the lower axial end, and wherein the support member comprises an accessory support pole;
- a plurality of leveling holes disposed in the mounting plate;
- a plurality of fasteners, wherein each of the fasteners is configured to engage with a corresponding one of the leveling holes;
- a deck support disposed on the mounting plate, the deck support having an upper surface and a support element, wherein the support element is disposed between the mounting plate and the deck support; and
- at least one blind branch, the at least one blind branch having an uppermost end and a lowermost end, wherein the at least one blind branch has a pivot member disposed between the lowermost end and the uppermost end, wherein the lowermost end is engagable with the deck support.

* * * * *